(12) United States Patent
Ohta et al.

(10) Patent No.: US 11,601,842 B2
(45) Date of Patent: Mar. 7, 2023

(54) COMMUNICATION DEVICE, COMMUNICATION METHOD, AND COMMUNICATION SYSTEM

(71) Applicant: FUJITSU LIMITED, Kawasaki (JP)

(72) Inventors: Yoshiaki Ohta, Yokohama (JP); Yoshihiro Kawasaki, Kawasaki (JP); Takayoshi Ode, Yokohama (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/106,939

(22) Filed: Aug. 21, 2018

(65) Prior Publication Data

US 2018/0359679 A1   Dec. 13, 2018

Related U.S. Application Data

(63) Continuation of application No. PCT/JP2016/064295, filed on May 13, 2016, and a continuation of application No. PCT/JP2016/055029, filed on Feb. 22, 2016.

(51) Int. Cl.
  *H04B 7/14* (2006.01)
  *H04B 17/24* (2015.01)
  (Continued)

(52) U.S. Cl.
  CPC .......... *H04W 28/0273* (2013.01); *H04B 7/14* (2013.01); *H04B 17/24* (2015.01);
  (Continued)

(58) Field of Classification Search
  CPC .. H04B 7/14–17; H04B 17/0082–0087; H04B 17/20–29; H04B 17/40; H04L 1/0078–0091; H04L 2001/0092–0097; H04L 1/08–22; H04L 5/003; H04L 5/0053–006; H04L 5/0064; H04L 5/0078–0089; H04L 47/10–41;
  (Continued)

(56) References Cited

U.S. PATENT DOCUMENTS

2004/0100979 A1   5/2004   Mandin et al.
2008/0019340 A1   1/2008   Ohta et al.
(Continued)

FOREIGN PATENT DOCUMENTS

JP   2000-295278 A   10/2000
JP   2004-180315 A   6/2004
(Continued)

OTHER PUBLICATIONS

Notice of Reasons for Refusal issued by the Japanese Patent Office for corresponding Japanese Patent Application No. 2018-500962, dated Jun. 4, 2019 with an English translation.

(Continued)

*Primary Examiner* — Timothy J Weidner
(74) *Attorney, Agent, or Firm* — Myers Wolin, LLC

(57) ABSTRACT

A communication device includes a receiver, a transmitter that executes first transmission processing and second transmission processing, and a controller that controls the transmitter in accordance with a radio quality of wireless communication so that either the first transmission processing or the second transmission processing is executed.

8 Claims, 16 Drawing Sheets

(51) Int. Cl.
| | |
|---|---|
| *H04L 1/16* | (2006.01) |
| *H04L 1/20* | (2006.01) |
| *H04L 47/10* | (2022.01) |
| *H04L 69/163* | (2022.01) |
| *H04W 24/08* | (2009.01) |
| *H04W 24/10* | (2009.01) |
| *H04W 28/02* | (2009.01) |
| *H04W 28/04* | (2009.01) |
| *H04W 28/06* | (2009.01) |
| *H04W 40/16* | (2009.01) |
| *H04W 72/02* | (2009.01) |
| *H04W 80/06* | (2009.01) |
| *H04W 92/10* | (2009.01) |
| *H04L 1/1607* | (2023.01) |

(52) U.S. Cl.
CPC .............. *H04L 1/1621* (2013.01); *H04L 1/20* (2013.01); *H04L 47/29* (2013.01); *H04L 69/163* (2013.01); *H04W 24/08* (2013.01); *H04W 24/10* (2013.01); *H04W 28/0236* (2013.01); *H04W 28/04* (2013.01); *H04W 28/06* (2013.01); *H04W 40/16* (2013.01); *H04W 72/02* (2013.01); *H04W 80/06* (2013.01); *H04W 92/10* (2013.01)

(58) Field of Classification Search
CPC ............. H04L 69/16–326; H04L 72/02; H04L 1/0001–248; H04W 24/02–10; H04W 28/02–14; H04W 40/12–18; H04W 72/04; H04W 72/1263–14; H04W 80/06; H04W 92/10

See application file for complete search history.

(56) References Cited

U.S. PATENT DOCUMENTS

| | | | | |
|---|---|---|---|---|
| 2009/0147734 | A1* | 6/2009 | Naka .................... | H04L 1/0026 |
| 2009/0274139 | A1* | 11/2009 | Palanki ................. | H04L 1/1854 |
| 2010/0329197 | A1* | 12/2010 | Boariu ................. | H04L 1/1825 |
| 2012/0188887 | A1* | 7/2012 | Kobayashi ............ | H04W 80/06 |
| 2012/0201136 | A1 | 8/2012 | Williams et al. | |
| 2016/0099801 | A1 | 4/2016 | Nagata et al. | |
| 2019/0132756 | A1* | 5/2019 | Okada .................... | H04W 24/08 |

FOREIGN PATENT DOCUMENTS

| | | | |
|---|---|---|---|
| JP | 2007-508746 | A | 4/2007 |
| JP | 2007-180687 | A | 7/2007 |
| JP | 2009-273094 | A | 11/2009 |
| JP | 2012-065158 | A | 3/2012 |
| JP | 2013-013093 | A | 1/2013 |
| JP | 2014-017568 | A | 1/2014 |
| JP | 2014-509483 | A | 4/2014 |
| JP | 2014-230262 | A | 12/2014 |
| JP | 2015-015534 | A | 1/2015 |
| JP | 2015-056742 | A | 3/2015 |
| WO | 2005/039117 | A1 | 4/2005 |
| WO | 2014/147951 | A1 | 9/2014 |

OTHER PUBLICATIONS

3GPP TS 36.300 V13.2.0 (Dec. 2015) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.211 V13.0.0 (Dec. 2015) 3rd Generation Partnership Project; Technical Specification Group Radio Access Network; Evolved Universal Terrestrial Radio Access (E-UTRA); Physical channels and modulation (Release 13).
3GPP TS 36.212 V13.0.0 (Dec. 2015) 3rd Generation Partnership Project; Technical Specification Group Radio Access Network; Evolved Universal Terrestrial Radio Access (E-UTRA); Multiplexing and channel coding (Release 13).
3GPP TS 36.213 V13.0.0 (Dec. 2015) 3rd Generation Partnership Project; Technical Specification Group Radio Access Network; Evolved Universal Terrestrial Radio Access (E-UTRA); Physical layer procedures (Release 13).
3GPP TS 36.321 V13.0.0 (Dec. 2015) 3rd Generation Partnership Project;Technical Specification Group Radio Access Network; Evolved Universal Terrestrial Radio Access (E-UTRA); Medium Access Control (MAC) protocol specification (Release 13).
3GPP TS 36.322 V13.0.0 (Dec. 2015) 3rd Generation Partnership Project; Technical Specification Group Radio Access Network; Evolved Universal Terrestrial Radio Access (E-UTRA); Radio Link Control (RLC) protocol specification (Release 13).
3GPP TS 36.323 V13.0.0 (Dec. 2015) 3rd Generation Partnership Project; Technical Specification Group Radio Access Network; Evolved Universal Terrestrial Radio Access (E-UTRA); Packet Data Convergence Protocol (PDCP) specification (Release 13).
3GPP TS 36.331 V13.0.0 (Dec. 2015) 3rd Generation Partnership Project; Technical Specification Group Radio Access Network; Evolved Universal Terrestrial Radio Access (E-UTRA); Radio Resource Control (RRC); Protocol specification (Release 13).
3GPP TR 36.881 V0.5.0 (Nov. 2015) 3rd Generation Partnership Project; Technical Specification Group Radio Access Network; Evolved Universal Terrestrial Radio Access (E-UTRA); Study on latency reduction techniques for LTE (Release 13).
RFC793, Transmission Control Protocol DARPA Internet Program Protocol Specification, Sep. 1981; prepared for Defense Advanced Research Projects Agency Information Processing Techniques Office, 1400 Wilson Boulevard, Arlington, Virginia 22209; by Information Sciences Institute University of Southern California, 4676 Admiralty Way, Marina del Rey, California 90291—dated Sep. 1981.
RFC896, Congestion Control in IP/TCP Internetworks, Jan. 1984; Network Working Group; Request For Comments: 896; John Nagle, 6, Jan. 1984, Ford Aerospace and Communications Corporation.
3GPP TS 23.401 V13.1.0 (Dec. 2014) 3rd Generation Partnership Project; Technical Specification Group Services and System Aspects; General Packet Radio Service (GPRS) enhancements for Evolved Universal Terrestrial Radio Access Network (E-UTRAN) access (Release 13).
International Search Report issued for corresponding International PCT Application No. PCT/JP2016/064295, dated Jul. 26, 2016.
Written Opinion issued for corresponding International PCT Application No. PCT/JP2016/064295, dated Jul. 26, 2016, with English translation attached.
Extended European search report with supplementary European search report and the European search opinion issued by the European Patent Office for corresponding European Patent Application No. 16891554.4, dated Dec. 12, 2018.
Communication pursuant to Article 94(3) EPC issued by the European Patent Office for corresponding European Patent Application No. 16 891 554.4-1215, dated Oct. 8, 2020.
First Notification of Office Action issued by China National Intellectual Property Administration for corresponding Chinese patent application No. 201680082217.9, dated Jun. 28, 2020, with a full English translation.

\* cited by examiner

COMMUNICATION DEVICE, COMMUNICATION METHOD, AND COMMUNICATION SYSTEM

CROSS-REFERENCE TO RELATED APPLICATION

This application is a continuation application of International Application PCT/JP2016/064295 filed on May 13, 2016 and designated the U.S., the entire contents of which are incorporated herein by reference. Further, this application is based upon and claims the benefit of priority from the prior International Patent Application PCT/JP2016/055029, filed on Feb. 22, 2016, the entire contents of which are incorporated herein by reference.

FIELD

The present invention relates to a communication device, a communication method, and a communication system.

BACKGROUND

In the standards organization 3GPP (3$^{rd}$ Generation Partnership Project), specifications of an LTE (Long Term Evolution) system and an LTE-A (LTE-Advanced) system based on an LTE system are currently either complete or under investigation.

A communication protocol known as TCP/IP (Transmission Control Protocol/Internet Protocol) may be used for data communication in LTE. TCP/IP is a protocol combining TCP and IP, and is used as standard on the Internet and so on.

In TCP communication, a transmission side communication device transmits a data packet and a reception side communication device, having been able to receive the data packet normally, transmits an ACK (Acknowledgement) in response to the received data packet. The transmission side communication device receives the ACK and then transmits the next data packet. Hence, in TCP communication, it is possible to confirm that the data packet has arrived upon reception of the ACK, and thus, reliable communication is realized.

In TCP communication, when the number of transmitted ACKs increases, communication resources are used to transmit the ACKs, and as a result, a reduction in communication speed may occur. Therefore, a method known as a Delayed TCP ACK method, for example, is available as a method for reducing the number of transmitted ACKs. In the Delayed TCP ACK method, the number of transmitted ACKs is reduced by transmitting a single ACK in response to a plurality of packets.

Technology relating to LTE and TCP/IP is described in the following prior art documents.

CITATION LIST

Patent Literature

Patent Literature 1: Japanese Patent Application Publication No. 2014-230262
Patent Literature 2: Japanese Patent Application Publication No. 2013-013093

Non-Patent Literature

Non-patent Literature 1: 3GPP TS36.300 V13.2.0 (2015-12)
Non-patent Literature 2: 3GPP TS36.211 V13.0.0 (2015-12)
Non-patent Literature 3: 3GPP TS36.212 V13.0.0 (2015-12)
Non-patent Literature 4: 3GPP TS36.213 V13.0.0 (2015-12)
Non-patent Literature 5: 3GPP TS36.321 V13.0.0 (2015-12)
Non-patent Literature 6: 3GPP TS36.322 V13.0.0 (2015-12)
Non-patent Literature 7: 3GPP TS36.323 V13.0.0 (2015-12)
Non-patent Literature 8: 3GPP TS36.331 V13.0.0 (2015-12)
Non-patent Literature 9: 3GPP TR36.881 V0.5.0 (2015-11)
Non-patent Literature 10: RFC793 (1981-09)
Non-patent Literature 11: RFC896 (1984-01)
Non-patent Literature 12: 3GPP TS23.401 V13.1.0 (2014-12)

SUMMARY

A communication device includes, a receiver that receives a packet from another communication device, a transmitter that executes first transmission processing, in which a first reception confirmation packet indicating reception of a first number of packets is transmitted to the other communication device every time the first number of packets is received from the other communication device, and second transmission processing, in which a second reception confirmation packet indicating reception of a second number of packets, the second number being smaller than the first number, is transmitted to the other communication device every time the second number of packets is received from the other communication device, and a controller that controls the transmitter in accordance with a radio quality of wireless communication with the other communication device so that either the first transmission processing or the second transmission processing is executed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described in detail below with reference to the figures. Problems and embodiments described in the present specification are examples, and do not limit the scope of rights of the present application. More particularly, even if expressions used in the description vary, as long as the various expressions mean technically the same matters, the technology of the present application can be applied on the basis of these different expressions without limiting the scope of rights.

A communication device using the Delayed TCP ACK method does not transmit an ACK until a plurality of packets have been received. For example, the communication device on the packet transmission side may execute control so that the next packet is not transmitted until an ACK is received, a sum of data to be transmitted reaches or exceeds a predetermined size, or a packet transmission wait timer times out.

When the transmission side communication device executes this type of control and the data to be transmitted are so small that the sum of the data to be transmitted does not reach or exceed the predetermined size, the next packet cannot be transmitted until the packet transmission wait timer times out. In this case, data reception is delayed in a reception side communication device waiting for the next data packet.

First Embodiment

First, a first embodiment will be described.

In the first embodiment, first or second transmission processing is executed in accordance with a radio quality used for wireless communication with another communication device. The first transmission processing is processing for transmitting a first reception confirmation packet indicating reception of a first number of packets to the other communication device every time the first number of packets is received from the other communication device. The second transmission processing is processing for transmitting a second reception confirmation packet indicating reception of a second number of packets, the second number being smaller than the first number, to the other communication device every time the second number of packets is received from the other communication device.

Figure 1:
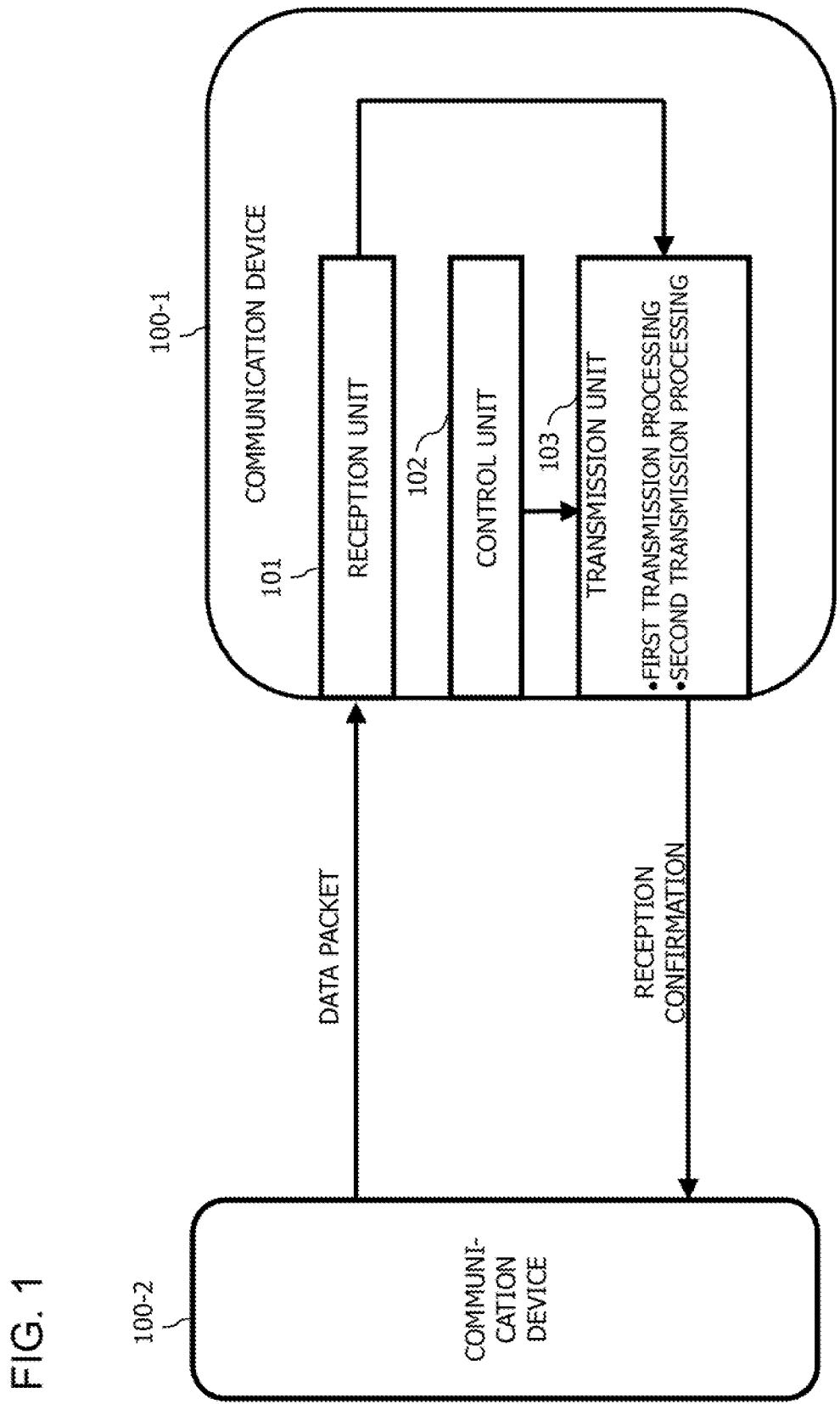
FIG. 1 is a figure depicting an example configuration of a communication system 10 according to the first embodiment.

FIG. 1 is a figure depicting an example configuration of a communication system 10 according to the first embodiment. The communication system 10 includes communication devices 100-1, 2. The communication devices 100-1, 2 are connected to each other wirelessly in order to exchange data using packets, for example. Further, the communication devices 100-1, 2 may be connected to each other via a relay device or the like, for example. The communication device 100 is a terminal device such as a portable telephone, or a computer such as a server or a host machine, for example. The communication devices 100-1, 2 communicate with each other on the basis of TCP/IP, for example. Further, the communication devices 100-1, 2 each include a CPU, storage, and a memory, not depicted in the figures, and by loading a program stored in the storage to the memory and executing the loaded program using the CPU, a receiver 101, a controller 102, and a transmitter 103 are constructed in order to execute respective types of processing. The communication device 100-1 includes the receiver 101, the controller 102, and the transmitter 103. The communication device 100-2 has a similar configuration (not depicted in the figures). Note that a packet used to transmit data will be referred to as a data packet, and a packet used to notify a transmission source communication device that a data packet has been received will be referred to as a reception confirmation packet (or an ACK). Further, the term "packet", when used alone, is assumed to refer to one or both of the data packet and the reception confirmation packet.

The transmitter 103 includes the first transmission processing and the second transmission processing. When the receiver 101 notifies the transmitter 103 that a data packet has been received, the transmitter 103 executes the first or the second transmission processing in accordance with control executed thereon by the controller 102.

The first transmission processing is processing for transmitting a reception confirmation packet (also referred to hereafter as the first reception confirmation packet) indicating reception of the first number of data packets when the first number of data packets is received. The first number is a plurality no smaller than two, and is set by an administrator of the communication system 10, for example, and stored in an internal memory. Since a single reception confirmation packet is transmitted in response to reception of the first number of data packets, the number of transmitted reception confirmation packets is smaller than that of a case in which a single reception confirmation packet is transmitted in response to reception of the second number of data packets, the second number being smaller than the first number (i.e. the second transmission processing).

The second transmission processing is processing for transmitting a reception confirmation packet (also referred to hereafter as the second reception confirmation packet) indicating reception of the second number of data packets when the second number of data packets is received. With the second transmission processing, a larger number of reception confirmation packets can be transmitted than with the first transmission processing, in which a reception confirmation packet is transmitted after receiving the first number of packets.

The controller 102 controls the transmitter in accordance with the radio quality of wireless communication with another communication device so that either the first or the second transmission processing is executed. When the radio quality is favorable, the effect on the communication speed of transmitting even a large number of reception confirmation packets is small, and therefore the controller 102 implements control so as to execute the second transmission processing, in which a larger number of reception confirmation packets must be transmitted. When the radio quality is unfavorable, on the other hand, the communication speed is highly likely to decrease if a larger number of reception confirmation packets are transmitted, and therefore the controller 102 implements control so as to execute the first transmission processing, in which the number of transmitted reception confirmation packets can be reduced, is executed.

Note that when the communication device 100-1 includes a radio quality measurer (not depicted in the figure), the radio quality may be measured by the communication device 100-1. Alternatively, radio quality information may be acquired from the communication device 100-2 or a relay device (not depicted in the figure) that relays communications between the communication devices. The relay device is a base station device provided between the communication devices 100-1 and 100-2 during wireless communication, for example.

Further, the radio quality is a degree of interference generated at a frequency of the radio waves used for communication, for example. As the degree of interference increases, the probability of packet loss and frame errors occurring during communication increases, and therefore the radio quality can be determined to be poor.

Furthermore, the radio quality information may be determined from information relating to a different communication protocol layer to that used to transmit the reception confirmation packet. For example, when the radio quality is determined on the basis of information relating to an amount of traffic in the communication system 10 and the amount of traffic is large, the possibility of interference increases, and therefore the radio quality is determined to be unfavorable. The communication device 100-1 adjusts the transmission amount of the reception confirmation packets on a layer (referred to as a TCP layer) for transmitting ACKs in accordance with radio quality information acquired on a layer (referred to as a radio layer) for acquiring the radio quality information, this layer being different to the TCP layer.

The receiver 101 receives a data packet and notifies the transmitter 103 that the data packet has been received. A reception confirmation packet relating to the received data packet may be created by either the receiver 101 or the transmitter 103.

In the first embodiment, the first or second transmission processing is executed in accordance with a radio quality measurement result. When the radio quality is favorable, transmission resources are not used for retransmission due to packet non-arrival, retransmission due to frame errors, and so on, for example, and therefore room is available in the transmission resources. Hence, the communication speed is unlikely to decrease even when the number of transmitted ACKs is left unsuppressed. Therefore, when the radio quality is favorable, the second transmission processing, rather than the first transmission processing, is executed.

In the communication device 100-2, a data packet is generally transmitted when an ACK is received, a predetermined amount of transmission data is generated, or a predetermined time elapses. Accordingly, in the case of the first transmission processing, in which an ACK is not transmitted until the transmission destination communication device 100-1 receives the first number of data packets, generation of data to be transmitted may be delayed in the communication device 100-2, leading to a delay in transmission of the generated data. Therefore, when the radio quality is favorable, the communication speed is preferably improved by executing the second transmission processing.

Further, when the first number is 2 and the second number is 1, for example, the first transmission processing corresponds to a delayed TCP ACK method in which an ACK is transmitted upon reception of two packets, and the second transmission processing corresponds to conventional processing in which an ACK is transmitted every time a packet is received. In this case, by executing the conventional processing when the radio quality is favorable, a delay occurring in data transmission and reception when the Delayed TCP ACK method is executed can be suppressed.

Note that the first transmission processing may be referred to as special processing and the second transmission processing may be referred to as basic processing. The basic processing denotes a Delayed TCP ACK method in which the number of received packets is 2 or processing for transmitting an ACK every time a packet is received, for example. The special processing denotes processing for executing a method (referred to hereafter as a Highest Ack method) in which ACKs are stored until an ACK transmission opportunity arises, and when an ACK transmission opportunity arises, only the ACK relating to the most recently received packet is transmitted, for example. The special processing also denotes processing for executing a method (referred to hereafter as a Grant Ack method) in which ACKs are stored until an ACK transmission opportunity arises, and when an ACK transmission opportunity arises, ACKs are transmitted in a number corresponding to radio resources allocated by a base station device or the like, for example.

Second Embodiment

Next, a second embodiment will be described.

In the second embodiment, the radio quality of the wireless communication with the other communication device denotes the degree of interference generated at the frequency of the radio waves used for the wireless communication. When the degree of interference is lower than a reference value, the communication device executes the second transmission processing, and when the degree of interference equals or exceeds the reference value, the communication device executes the first transmission processing. Further, in the second embodiment, a measurer is provided to measure the radio quality periodically.

Example Configuration of Communication System

Figure 2:
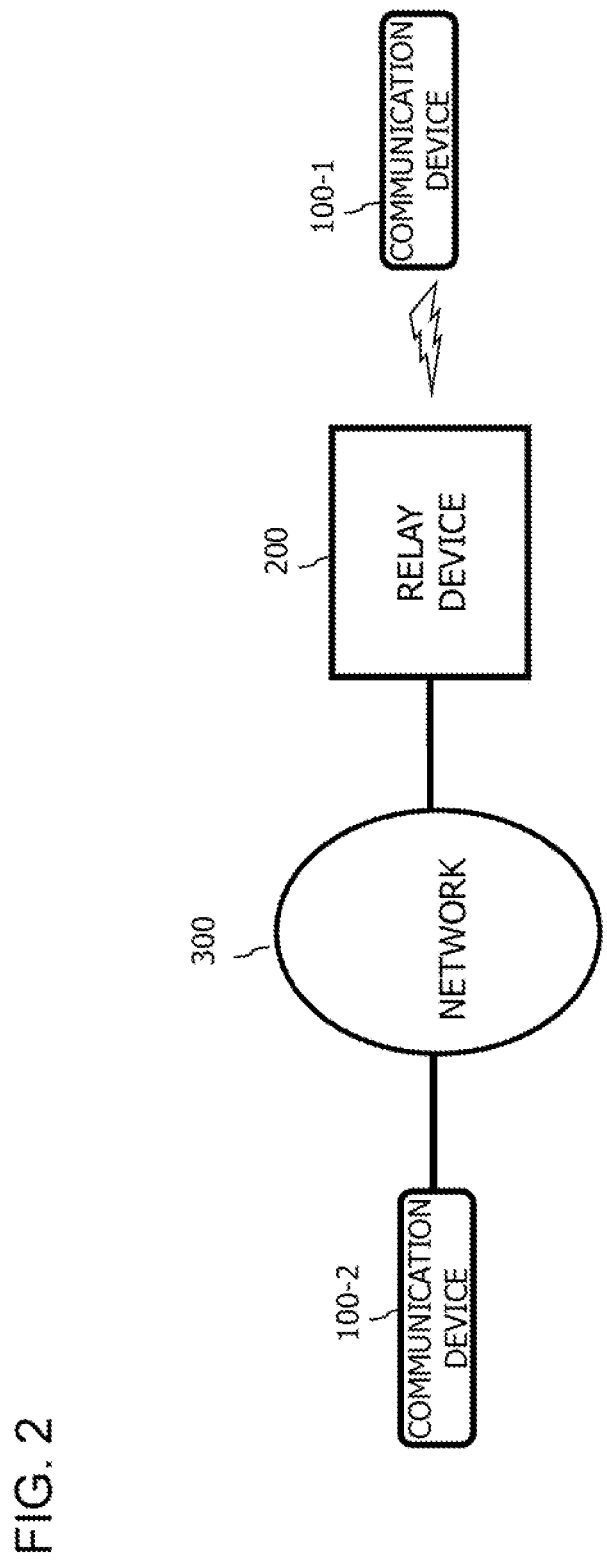
FIG. 2 is a figure depicting an example configuration of the communication system 10.

FIG. 2 is a figure depicting an example configuration of the communication system 10. The communication system 10 includes the communication devices 100-1, 2, a relay device 200, and a network 300. The communication system 10 conforms to LTE communication standards, for example.

The communication device 100 is a portable terminal or a computer, for example. The communication device 100-1 communicates with the communication device 100-2 in order to download data and received provided services from the communication device 100-2, for example. Further, the communication devices 100-1 and 100-2 communicate on the basis of TCP/IP, for example.

The relay device 200 is a packet relay device for relaying packets that are exchanged between the communication devices 100. Note that when the communication device 100 has a function for relaying packets exchanged between the communication devices 100, the relay device 200 may be the communication device 100. In LTE, the relay device 200 is a base station device such as an eNodeB (evolved Node B), for example. The relay device 200 may also be a switch or a network device such as a router.

The network 300 may be the Internet or an intranet constituted by a leased line, for example.

Example Configuration of Communication Device

Figure 3:
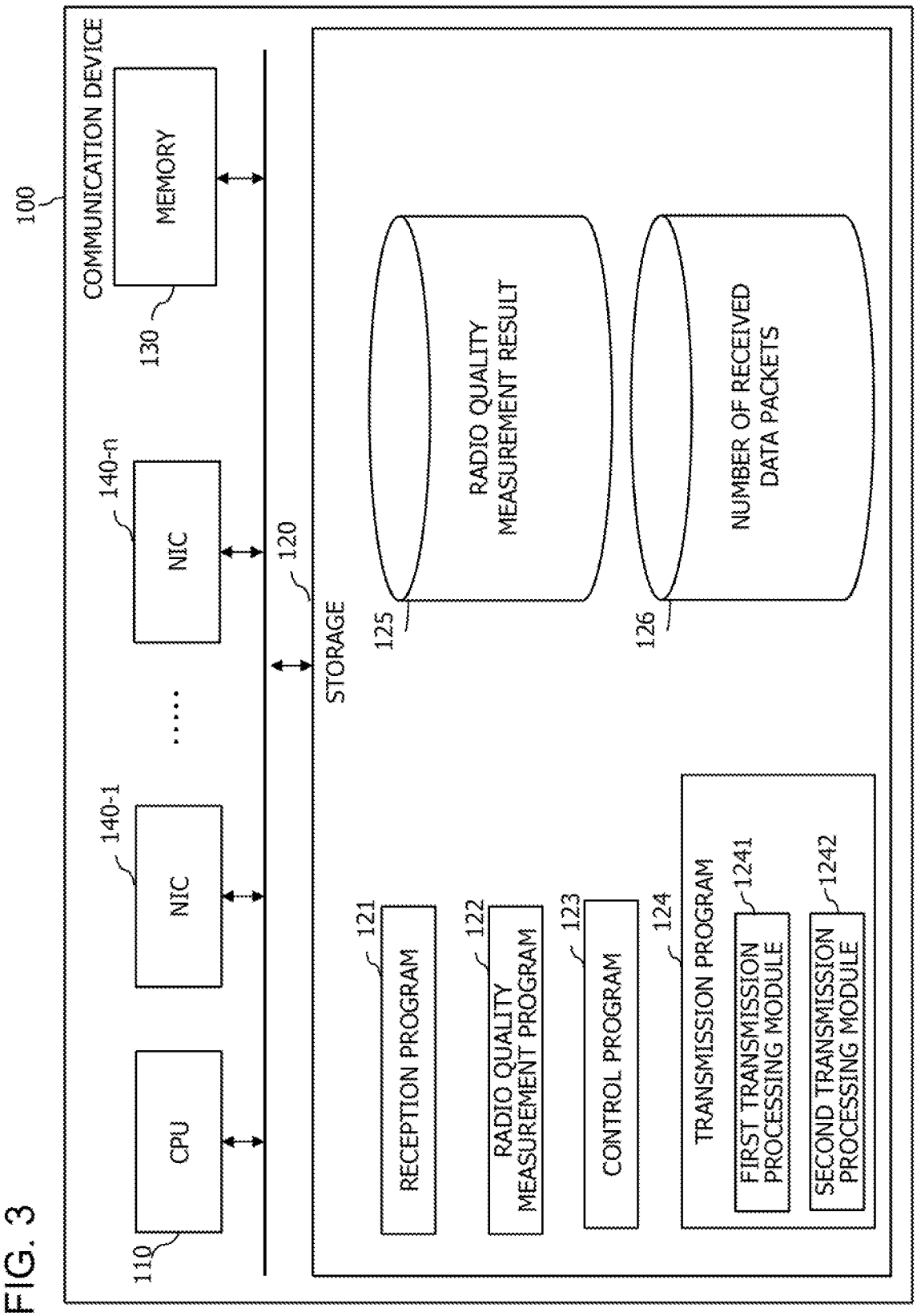
FIG. 3 is a figure depicting an example configuration of the communication device 100.

FIG. 3 is a figure depicting an example configuration of the communication device 100. The communication device 100 includes a CPU (Central Processing Unit) 110, storage 120, a memory 130, and NICs (Network Interface Cards) 140-1 to 140-n.

The storage 120 is an auxiliary storage device for storing programs and data. The storage 120 stores a reception program 121, a radio quality measurement program 122, a control program 123, a transmission program 124, a radio quality measurement result 125, and a number of received data packets 126.

The radio quality measurement result 125 is an area for storing the measured radio quality. After executing radio quality measurement, the communication device 100 stores the result in the radio quality measurement result 125.

The number of received data packets 126 is an area used when the first transmission processing is executed to store the number of data packets received since the previous ACK was transmitted. When an ACK is transmitted, the number of received data packets 126 is flushed out.

The memory 130 is an area to which the programs stored in the storage 120 are loaded. The memory 130 is also used as an area for storing programs and data.

The NICs 140-1 to 140-n are devices for connecting to and communicating with the other communication device either wirelessly or by wire. The NICs 140-1 to 140-n may be connected to the other communication device via a hub or a switch.

The CPU 110 is a processor that realizes respective types of processing by loading a program stored in the storage 120 to the memory 130 and executing the loaded program.

By executing the reception program 121, the CPU 110 constructs a receiver in order to execute reception processing. The reception processing is processing for receiving a packet from the other communication device. Upon reception of a data packet, the receiver notifies a transmitter that a data packet has been received.

Further, by executing the radio quality measurement program 122, the CPU 110 constructs the measurer in order to execute radio quality measurement processing. The radio quality measurement processing is processing for measuring the radio quality by, for example, measuring radio waves at the frequency used for communication and measuring a degree of interference indicating the amount of interference being generated therein. The measurer notifies a controller of the measurement result.

Furthermore, by executing the control program 123, the CPU 110 constructs the controller in order to execute control processing. The control processing is processing for switching between the first transmission processing and the second transmission processing on the basis of the result of the radio quality measurement processing. Upon reception of the measurement result from the measurer, the controller implements control to execute either the first transmission processing or the second transmission processing.

Furthermore, by executing the transmission program 124, the CPU 110 constructs the transmitter in order to execute transmission processing. The transmission processing is processing for executing the first or the second transmission processing under the control of the controller. The transmitter executes the first or the second transmission processing under the control of the controller after being notified by the receiver that a data packet has been received. The CPU 110 executes the first transmission processing by executing a first transmission processing module 1241 and executes the second transmission processing by executing a second transmission processing module 1242.

The first transmission processing is processing for transmitting a single ACK in response to the first number of data packets. In the first transmission processing, when a data packet is received, an ACK is transmitted if the number of received data packets has reached the first number, but if the number of received data packets has not reached the first number, an ACK is not transmitted, and instead, the communication device waits to receive the next data packet.

The second transmission processing is processing for transmitting a single ACK in response to the second number of data packets. In the second transmission processing, when a data packet is received, an ACK is transmitted if the number of received data packets has reached the second number, but if the number of received data packets has not reached the second number, an ACK is not transmitted, and instead, the communication device waits to receive the next data packet. Depending on the timing of a switch between the first transmission processing and the second transmission processing, a data packet for which an ACK has not been transmitted may exist during the first transmission processing. In the second transmission processing, however, an ACK is also transmitted in relation to the data packet for which an ACK was not transmitted during the first transmission processing.

Packet Transmission/Reception Processing

Processing executed in the communication devices to transmit and receive packets when the radio quality is favorable and when the radio quality is unfavorable will be described respectively below. A case in which the radio quality is favorable will be described first, followed by a case in which the radio quality is unfavorable.

Figure 4:
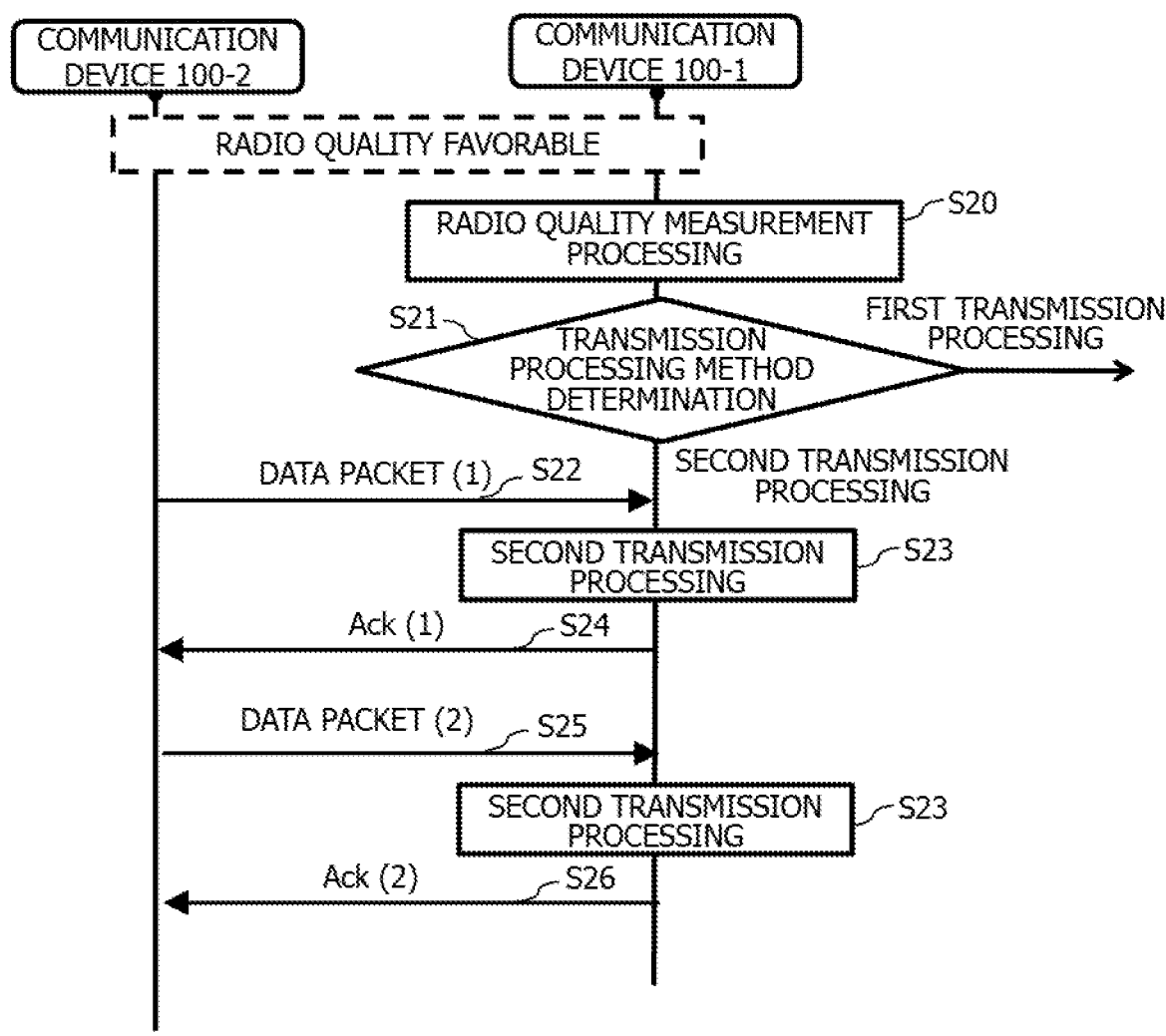
FIG. 4 is a figure depicting an example of a sequence implemented in the communication devices to transmit and receive packets when the radio quality is favorable.

FIG. 4 is a figure depicting an example of a sequence implemented in the communication devices to transmit and receive packets when the radio quality is favorable. Packet transmission/reception processing executed by the communication devices 100 will be described below using FIG. 4. The sequence in FIG. 4 illustrates, as an example, a case in which the first number is 2 and the second number is 1.

The communication device 100-1 executes radio quality measurement processing (S20). The radio quality measurement processing (S20) is executed periodically, for example. The communication device 100-1 then executes a transmission processing method determination (S21) on the basis of the radio quality measurement result.

Figure 5:
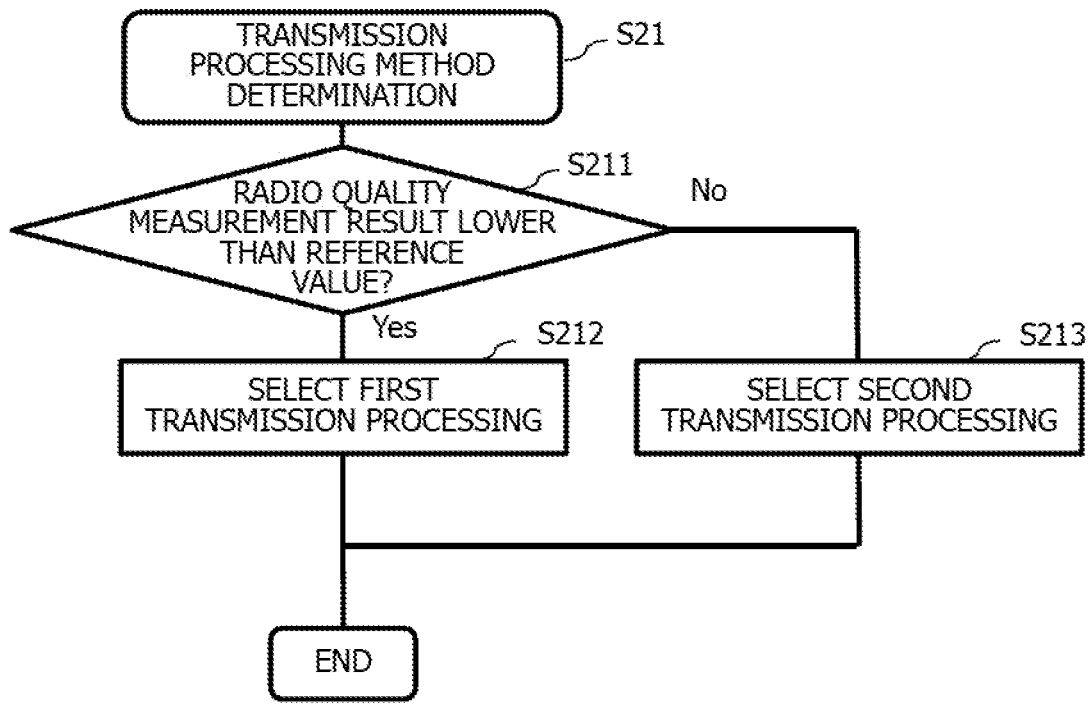
FIG. 5 is a figure depicting an example of a processing flowchart of the transmission processing method determination.

FIG. 5 is a figure depicting an example of a processing flowchart of the transmission processing method determination (S21). The communication device 100-1 checks whether or not the radio quality measurement result is lower than a reference value (S211). The radio quality is a degree of interference indicating the amount of interference being generated in the radio waves at the frequency used for communication, for example. When the radio quality is a degree of interference, the reference value is a numerical value indicating a proportion of 20% or the like, for example.

When the radio quality measurement result is lower than the reference value (Yes in S211), or in other words when the degree of interference is low and the radio quality is favorable, the communication device 100-1 selects the second transmission processing (S212). Further, when the radio quality measurement result equals or exceeds the reference value (No in S211), or in other words when the degree of interference is high and the radio quality is unfavorable, the communication device 100-1 selects the first transmission processing. In the transmission processing method determination, the second transmission processing is selected when the radio quality is favorable, and the first transmission processing is selected when the radio quality is unfavorable.

Returning to the sequence in FIG. 4, since the radio quality is favorable, the communication device 100-1 selects the second transmission processing. The communication device 100-1 executes the second transmission processing selected in the transmission processing method determination (S21) upon reception of a data packet (1) (denoting a packet having a packet identifier 1; denoted similarly hereafter).

Figure 6:
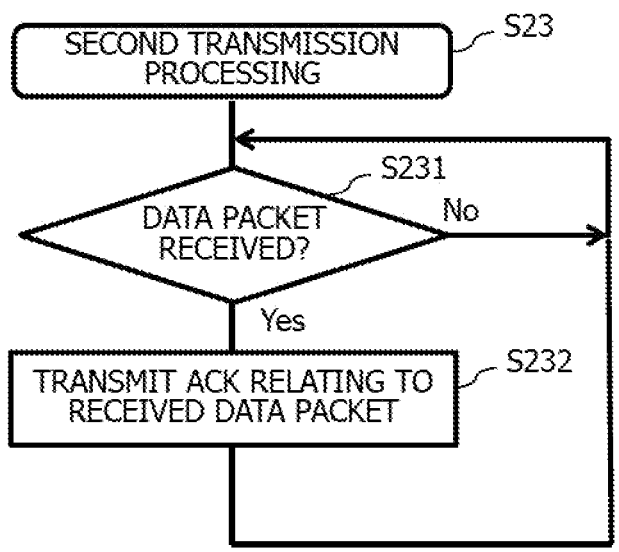
FIG. 6 is a figure depicting an example of a processing flowchart of the second transmission processing.

FIG. 6 is a figure depicting an example of a processing flowchart of the second transmission processing. In this embodiment, the second number is 1, and therefore the communication device 100 transmits an ACK every time a data packet is received.

Upon reception of a data packet (Yes in S231), the communication device 100 creates an ACK relating to the received data packet, and transmits the created ACK to the transmission source communication device (S232). To clarify the data packet to which the ACK relates, the packet identifier of the data packet is included in the ACK. The packet identifier is an identifier for identifying the data packet uniquely, such as a sequence number indicating a transmission order of the data packet, for example.

Returning to the sequence in FIG. 4, upon reception of the data packet (1), the communication device 100-1 transmits an ACK (1) relating to the received data packet to the communication device 100-2 (S24). Then, upon reception of a data packet (2) (S25), the communication device 100-1 executes the second transmission processing (S23), whereby an ACK (2) is transmitted to the communication device 100-2 (S26).

Figure 7:
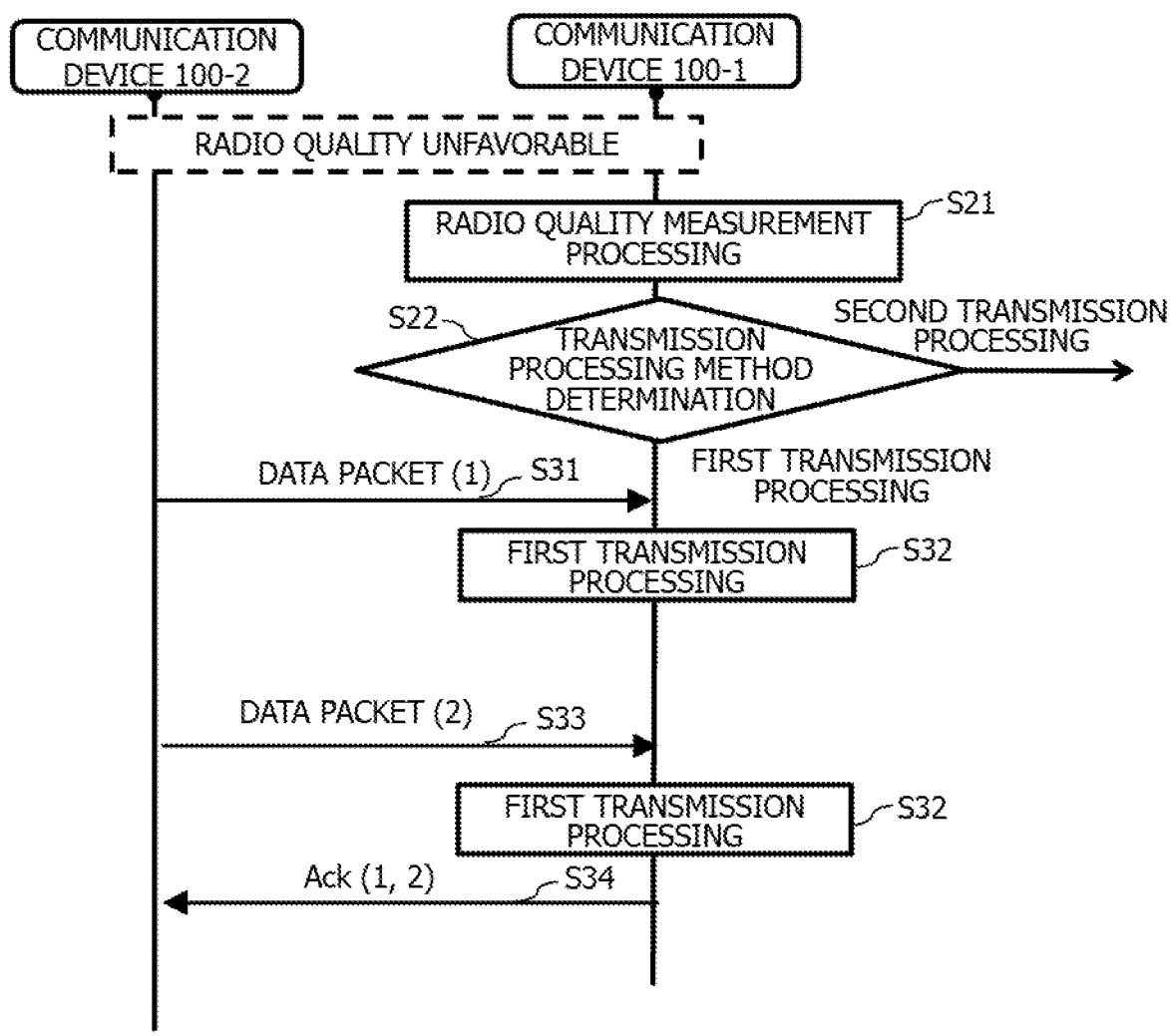
FIG. 7 is a figure depicting an example of a sequence implemented in the communication devices to transmit and receive packets when the radio quality is unfavorable.

FIG. 7 is a figure depicting an example of a sequence implemented in the communication devices to transmit and receive packets when the radio quality is unfavorable. The packet transmission/reception processing executed by the communication devices 100 will be described below using FIG. 7. Note that processing from the transmission processing method determination (S21) onward, which differs from the processing of the sequence depicted in FIG. 4, will be described.

When the radio quality is unfavorable, or in other words when the radio quality is not favorable, the communication device 100-1 selects the first transmission processing. The communication device 100-1 executes the first transmission processing selected in the transmission processing method determination (S21) upon reception of the data packet (1) (S31).

Figure 8:
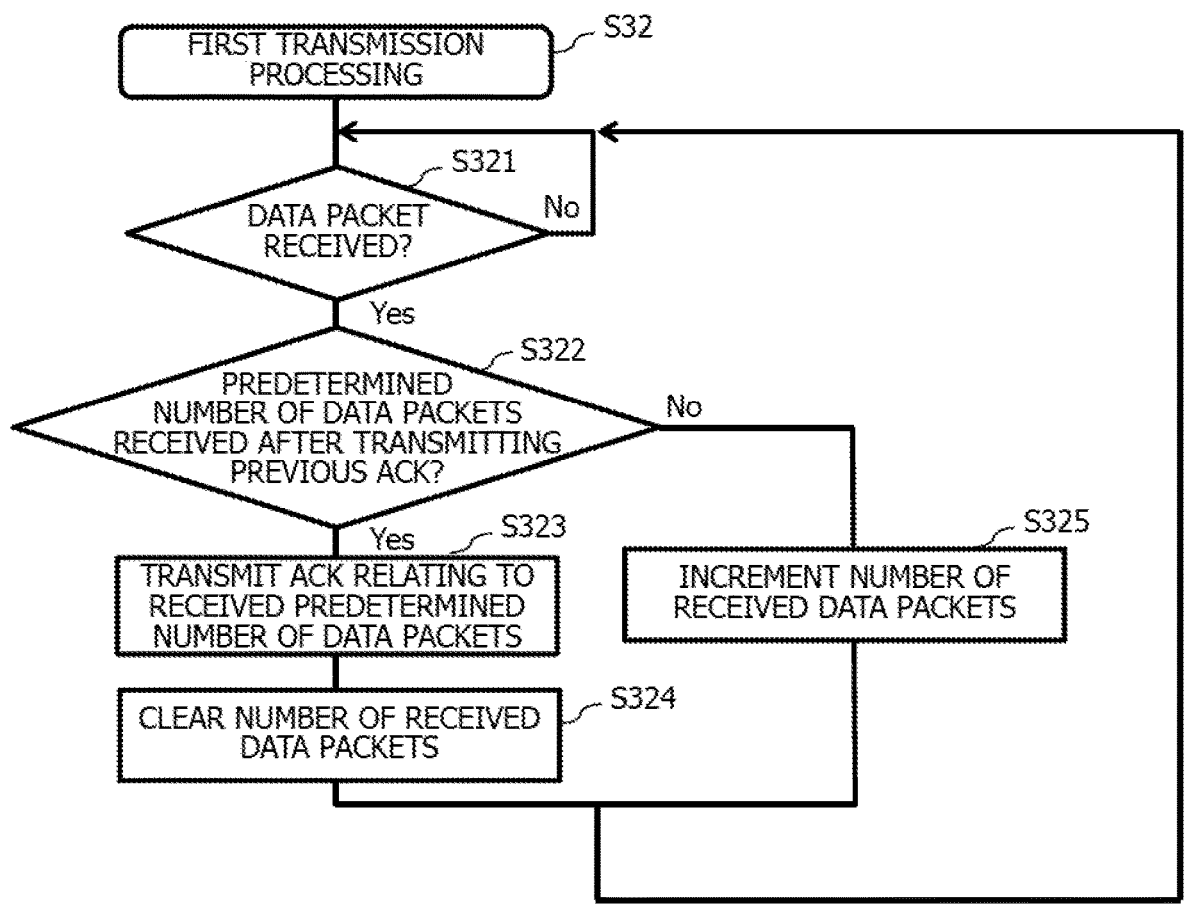
FIG. 8 is a figure depicting an example of a processing flowchart of the first transmission processing.

FIG. 8 is a figure depicting an example of a processing flowchart of the first transmission processing. Upon reception of a data packet (Yes in S321), the communication device 100 determines whether or not the first number (also referred to hereafter as a predetermined number) of data packets has been received following transmission of the previous ACK (S322). In the determination S322, it is determined that the predetermined number of data packets has been received following transmission of the previous ACK when a number acquired by adding the data packet (a single packet) received this time to the number of received data packets 126 equals the predetermined number.

When it is determined that the predetermined number of data packets has been received following transmission of the previous ACK (Yes in S322), the communication device 100 creates an ACK relating to the received predetermined number of data packets, and transmits the created ACK to the transmission source communication device (S323). The number of received data packets 126 is then flashed out (S324).

When it is determined that the predetermined number of data packets has not been received following transmission of the previous ACK (No in S322), the communication device 100 increments the number of received data packets 126 (S325) and waits to receive a data packet.

Returning to the sequence in FIG. 7, when the data packet (1) is received, the predetermined number of data packets has not yet been received, and therefore the communication device 100-1 increments the number of received data packets and waits to receive the next data packet.

When the data packet (2) is received (S32), the predetermined number of data packets, i.e. two packets, has been received, and therefore the communication device 100-1 transmits an ACK (1, 2) relating to the data packets (1) and (2) to the communication device 100-2 (S34). The communication device 100-1 then flashes out the number of received data packets.

Figure 9:
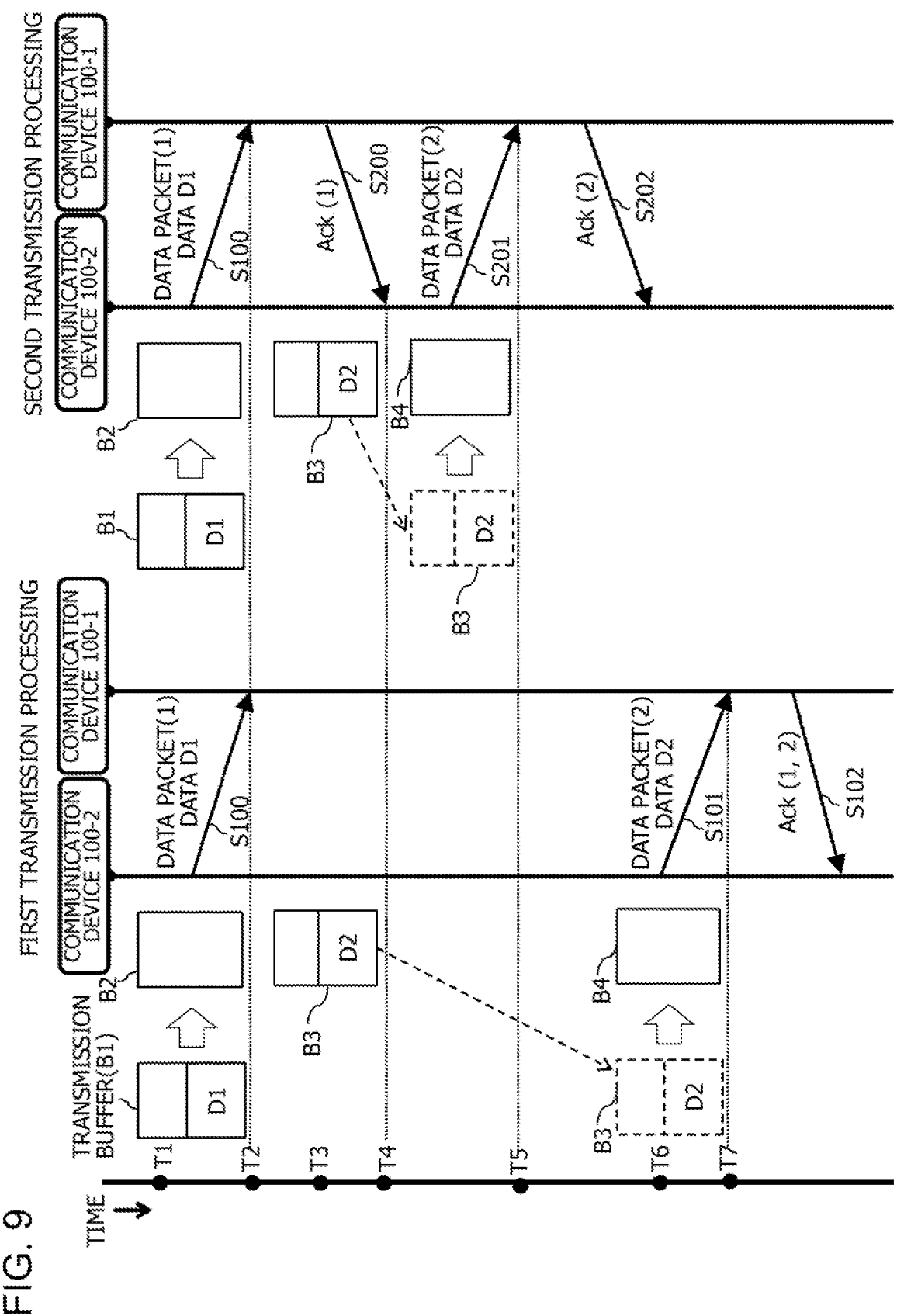
FIG. 9 is a figure depicting an example of a comparison between the packet transmission/reception sequences of the first and second transmission processing.

FIG. 9 is a figure depicting an example of a comparison between the packet transmission/reception sequences of the first and second transmission processing. The communication device 100-2 transmits data D1 and D2 to the communication device 100-1 using data packets. The number of transmitted ACKs and the arrival timing of the data D2 in the first and second transmission processing will be described below using the sequence in FIG. 9.

A transmission control method (referred to hereafter as plural data transmission control) known as Nagle's algorithm, in which an overhead of data transmission generated by attaching a header to a packet is reduced by transmitting a plurality of data in a single data packet, for example, is known as a type of data packet transmission control executed by a communication device. In plural data transmission control, the communication device 100-2 stores data to be transmitted temporarily in a buffer (referred to hereafter as a transmission buffer) rather than transmitting the data as soon as the data are generated.

Then, (1) when data are stored up to a predetermined size, the communication device 100-2 transmits the stored data in a single packet.

Further, (2) when the communication device 100-2 receives an ACK before data are stored up to the predetermined size, the communication device 100-2 transmits the data that are stored upon reception of the ACK in a single packet. When an ACK is received, this means that the previously transmitted packet has arrived at the transmission source communication device, and therefore packet transmission resources are available. Hence, in order to use the transmission resources effectively, a packet is transmitted without waiting for data to be stored up to the predetermined size.

Furthermore, (3) the communication device 100-2 activates a packet transmission wait timer and transmits the stored data in a single packet when the timer times out. This is to suppress a delay in data transmission caused by idly waiting for transmission data to be generated up to the predetermined size in a case where generation of the transmission data is delayed. It is assumed in the following description that the communication device 100-2 on the data transmission side executes plural data transmission control.

First, a case illustrated on the left side in FIG. 9, in which the communication device 100-1 executes the first transmission processing, will be described. It is assumed that in the first transmission processing, an ACK is transmitted upon reception of two data packets.

At a time T1, a packet transmission opportunity arises (for example, the packet transmission wait timer times out) in the communication device 100-2. At the time T1, the data D1 are stored in a transmission buffer (B1) of the communication device 100-2. The communication device 100-2 creates a data packet (1) including the data DI. stored in the transmission buffer, and transmits the created data packet (1) to the communication device 100-1 (S100). After the data D1 are transmitted, the transmission buffer (B2) enters a state in which no data are stored therein.

At a time T2, the communication device 100-1 receives the data packet (1). The communication device 100-1 is executing the first transmission processing, and therefore does not transmit an ACK until a second data packet is received.

At a time T3, the communication device 100-2 generates the data D2. Data are generated asynchronously with packet transmission by an application executed by the communication device 100-2, for example. When the data D2 are generated, the data D2 are stored in the transmission buffer (B3) by the communication device 100-2. At this time, data are not yet stored in the transmission buffer up to the predetermined size, and therefore the communication device 100-2 does not transmit the data D2.

From the time T3 to a time T6, no subsequent data are generated by the communication device 100-2, and therefore no new data are stored in the transmission buffer B.

Eventually, at the time T6, the packet transmission wait timer expires such that a packet transmission opportunity arises in the communication device 100-2. Accordingly, the communication device 100-2 creates a data packet (2) including the data D2 stored in the transmission buffer (B3) at the time T6, and transmits the created data packet (2) to the communication device 100-1 (S101). After the data packet (2) is transmitted, the transmission buffer (B4) enters a state in which no data are stored therein.

At a time T7, the communication device 100-1 receives the data packet (2) and thereby acquires the data D2. The communication device 100-1 then transmits an ACK (1, 2) relating to the data packets (1) and (2) to the communication device 100-2.

Next, a case illustrated on the right side in FIG. 9, in which the communication device 100-1 executes the second transmission processing, will be described.

Processing executed by the communication device 100-1 at a time T1 is identical to that of the first transmission processing, described above.

At a time T2, the communication device 100-1 receives the data packet (1). The communication device 100-1 is executing the second transmission processing, and therefore creates an ACK (1) relating to the received data packet (1) and transmits the created ACK (1) to the communication device 100-2 (S200).

Processing executed by the communication device 100-1 at a time T3 is identical to that of the first transmission processing, described above.

At a time T4, the communication device 100-2 receives the ACK (2). When the ACK is received, a transmission opportunity arises in the communication device 100-2, and therefore the communication device 100-2 creates a data packet (2) including the data D2 that are stored in the transmission buffer (B3) upon reception of the ACK, and transmits the created data packet (2) to the communication device 100-1 (S201). After the data packet (2) is transmitted, the transmission buffer (B4) enters a state in which no data are stored therein.

At a time T5, the communication device 100-1 receives the data packet (2) and thereby acquires the data D2. The communication device 100-1 then transmits an ACK (2) relating to the data packet (2) to the communication device 100-2.

As described above, the timing at which the communication device 100-1 acquires the data D2 is the time T7 in the first transmission processing and the time T5 in the second transmission processing, and therefore the data D2 are received earlier in the second transmission processing. In the second transmission processing, therefore, by transmitting an ACK every time a data packet is received, the communication device 100-2 can be provided with a packet transmission opportunity without waiting for the packet transmission wait timer to time out or for data to be stored up to the predetermined size.

Further, ACKs are transmitted less frequently in the first transmission processing than in the second transmission processing. With the first transmission processing, therefore, the number of transmitted ACKs can be suppressed, and as a result, a transmission resource deficiency caused by ACK transmission can be suppressed.

Hence, by executing the first transmission processing when the radio quality is unfavorable such that no room is available in the transmission resources due to the need for packet retransmission processing and the like, a resource deficiency due to ACK transmission can be avoided, and as a result, a reduction in communication speed can be prevented.

Conversely, by executing the second transmission processing when the radio quality is favorable such that packet retransmission processing and the like are not needed and room is available in the transmission resources, a delay in data transmission/reception can be suppressed while preventing a reduction in communication speed. In other words, the first transmission processing and second transmission processing serving as the processing executed on the TCP layer are selected in accordance with information from the radio layer. It may therefore be said that in the communication devices, the first and second transmission processing are realized by means of inter-layer cooperation, in which control on a certain layer is determined in accordance with information from a different layer.

Third embodiment

Next, a third embodiment will be described.

The communication device includes a controller for controlling the transmitter in accordance with the radio quality of the wireless communication with the other communication device so as to execute either the first transmission processing or the second transmission processing. Further, the controller executes the second transmission processing when the radio quality indicates that the communication device itself is positioned at the edge of a communication area (referred to hereafter as a cell) of a relay device.

Transmission Processing Method Determination

Figure 10:
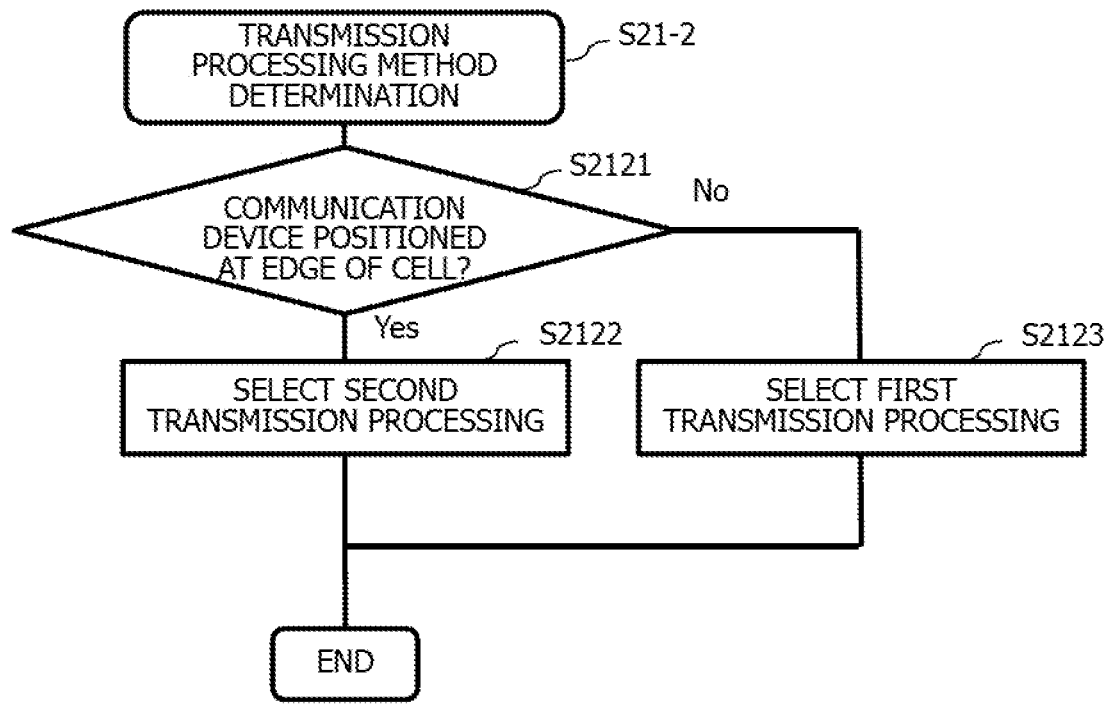
FIG. 10 is a figure depicting an example of a processing flowchart of a transmission processing method determination according to the third embodiment.

FIG. 10 is a figure depicting an example of a processing flowchart of a transmission processing method determination according to the third embodiment. The transmission processing method determination will be described below.

The communication device determines whether or not the communication device itself is positioned at the edge of the cell of the relay device (S2121). The edge of the cell of the relay device is an area within the cell of the relay device that is at least a predetermined distance away from the relay device, for example. When the communication device is positioned at the edge of the cell of the relay device, interference is caused by radio waves transmitted from another communication device, and radio waves transmitted by the relay device attenuate such that a reception power of the radio waves transmitted from the relay device weakens. As a result, packet transmission and reception is more likely to fail.

The communication device determines whether or not the communication device itself is positioned at the edge of the cell of the relay device in accordance with the radio quality of the wireless communication with the other communication device. The radio quality of the wireless communication with the other communication device is the reception power of the radio waves received from the relay device that relays wireless communications to and from the other communication device, for example. When the reception power of the radio waves received from the relay device is equal to or smaller than a reception power threshold, the communication device determines that the device itself is positioned at the edge of the cell of the relay device. In other words, when the radio quality of the wireless communication with the other communication device indicates that the communication device itself is positioned at the edge of the communication area of the relay device that relays wireless communications to and from the other communication device, the controller of the communication device selects the first transmission processing. The reception power threshold is a reception power at which the communication device fails to transmit and receive packets at a predetermined rate, for example, and is calculated from experiment or simulation results.

When the communication device determines that the device itself is positioned at the edge of the cell (Yes in S2121), the communication device selects the first transmission processing (S2122). Further, when the communication device determines that the device itself is not positioned at the edge of the cell (No in S2121), the communication device selects the second transmission processing (S2123).

In the third embodiment, when the communication device is positioned at the edge of the cell, the first transmission processing, in which the number of transmitted ACKs is small, is selected. In so doing, the number of transmitted ACKs can be reduced in a case where the communication device is positioned at the edge of the cell, where the radio quality is unfavorable, and as a result, a reduction in throughput can be prevented.

Simulation

Simulation results acquired in the third embodiment will now be described. In the simulation, a method (referred to hereafter as a Basic method) in which the second number is 1 is referred to as the second transmission processing, and either the Grant Ack method or the Highest Ack method is referred to as the first transmission processing.

Figure 11:
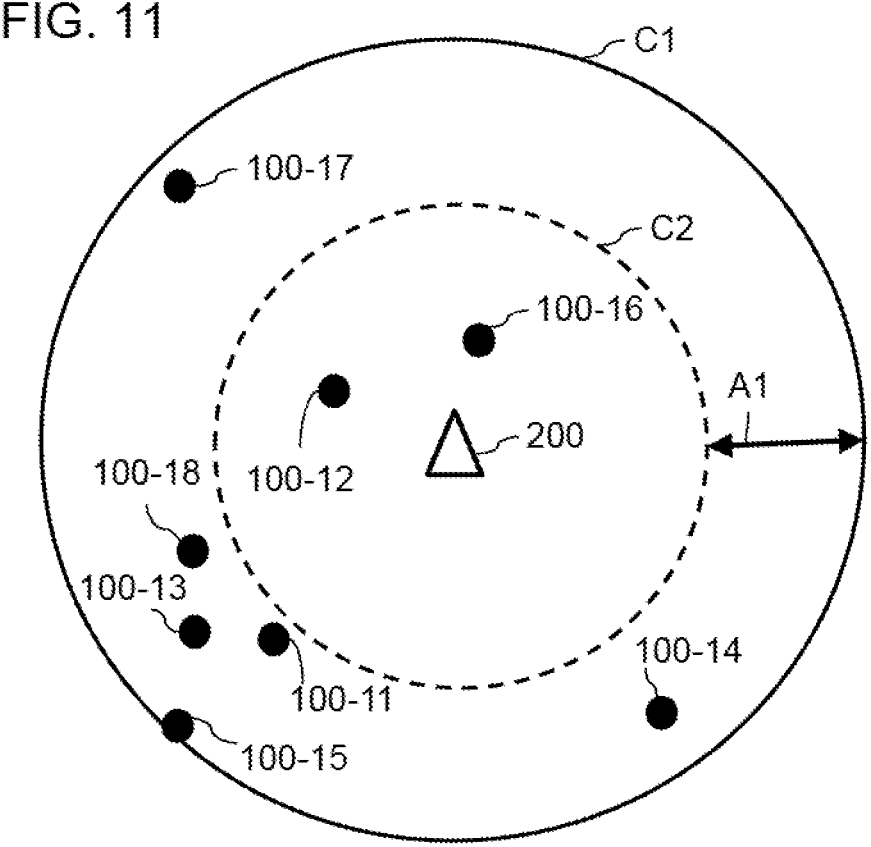
FIG. 11 is a figure depicting an example of positions of communication devices during the simulation.

FIG. 11 is a figure depicting an example of positions of communication devices during the simulation. In FIG. 11, the relay device 200 is positioned in the center of a cell C1, and communication devices 100-11 to 100-18 are positioned within the cell C1. In the simulation, an area (A1) that is within the cell C1 but not within a circle C2 is set as the edge of the cell. The communication devices 100-12 and 100-16 are positioned in an area not at the edge of the cell, and the other communication devices are positioned at the edge of the cell.

Conditions of the simulation will now be described. To evaluate a downlink throughput in cases where the first transmission processing and second transmission processing are executed, a simulation is executed using FTP (File Transfer Protocol) communication of an infinite length file. The main wireless parameters are set to comply with a 3GPP Case 1 model. As packet scheduling methods, a PF (Proportional Fairness) method is employed on the downlink and an RR (Round Robin) method is employed on the uplink. During FTP communication of an infinite length file, a large number of ACKs are generated, and therefore methods in which an eNB grants the communication device transmission permission (UL Grant) in advance are employed. Transmission permission is granted at a period of 5 ms.

Figure 12:
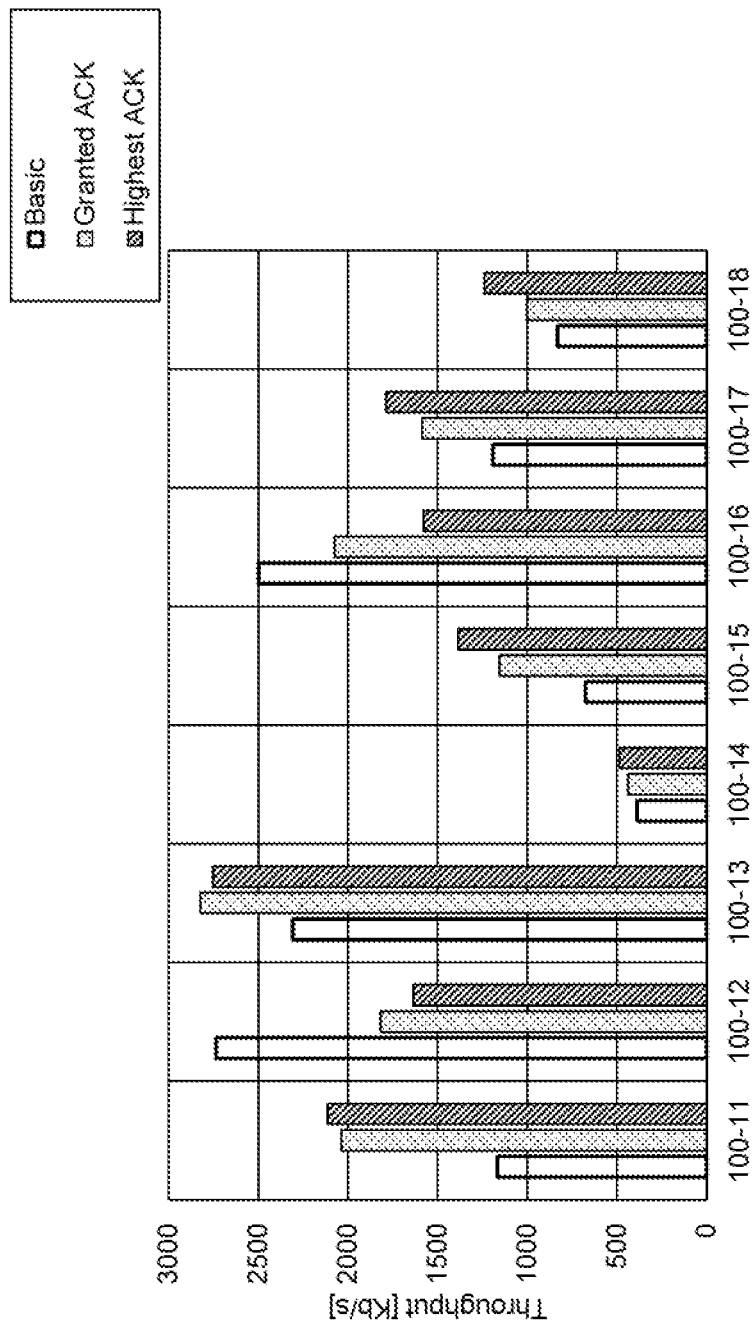
FIG. 12 is a figure illustrating an example of simulation results.

FIG. 12 is a figure illustrating an example of simulation results. A graph for each of the communication devices 100-11 to 100-18 illustrates the average throughput when communication is executed using, in order from the left, the Basic method (the second transmission processing), the Grant Ack method (the first transmission processing), and the Highest Ack method (the first transmission processing). The vertical axis of the graph indicates an average value of the throughput of each communication device, and the horizontal axis indicates the respective communication devices 100-11 to 100-18.

The communication devices 100-11, 100-13, 100-14, 100-15, 100-17, and 100-18 positioned at the edge of the cell achieve a higher throughput by implementing communication using the first transmission processing (the Highest Ack method or the Grant Ack method) than by implementing communication using the second transmission processing (the Basic method). Conversely, the communication devices 100-12 and 100-16 not positioned at the edge of the cell achieve a higher throughput by implementing communication using the second transmission processing (the Basic method) than by implementing communication using the first transmission processing (the Highest Ack method or the Grant Ack method). Hence, by switching the communication method such that the first transmission processing is executed when the communication device is positioned at the edge of the cell and the second transmission processing is executed when the communication device is not positioned at the edge of the cell, the throughput of the communication device is improved.

Note that the communication device may also determine that the device itself is positioned at the edge of the cell when, for example, a CQI (Channel Quality Indicator), which is an index of a reception quality of a downlink channel, is equal to or smaller than a predetermined value.

Further, the communication device may select the second transmission processing when moving at high speed. When the communication device moves at high speed, it may be impossible to execute communication with stability due to frequency variation (the Doppler effect, for example) caused by movement of received radio waves, repeated handovers, and so on. By having the communication device select the second transmission processing when moving at high speed, a reduction in throughput caused by the high-speed movement can be prevented. Note that a determination as to whether or not the communication device is moving at high speed may be made by calculating a degree of deviation between the frequency of the radio waves transmitted by the relay device and the frequency of the radio waves received by the communication device, and determining that the communication device is moving at high speed when the deviation equals or exceeds a predetermined value, for example. Further, when the communication device includes a GPS (Global Positioning System), a moved distance per unit time may be calculated from information indicating the position of the communication device, acquired by the GPS, and the communication device may be determined to be moving at high speed when the calculation results equals or exceeds a predetermined value.

Fourth Embodiment

Next, a fourth embodiment will be described.

In the fourth embodiment, the communication device acquires information relating the radio quality from the other communication device or the relay device, and executes the first or second transmission processing in accordance with the acquired radio quality.

Example Configuration of Communication Device

Figure 13:
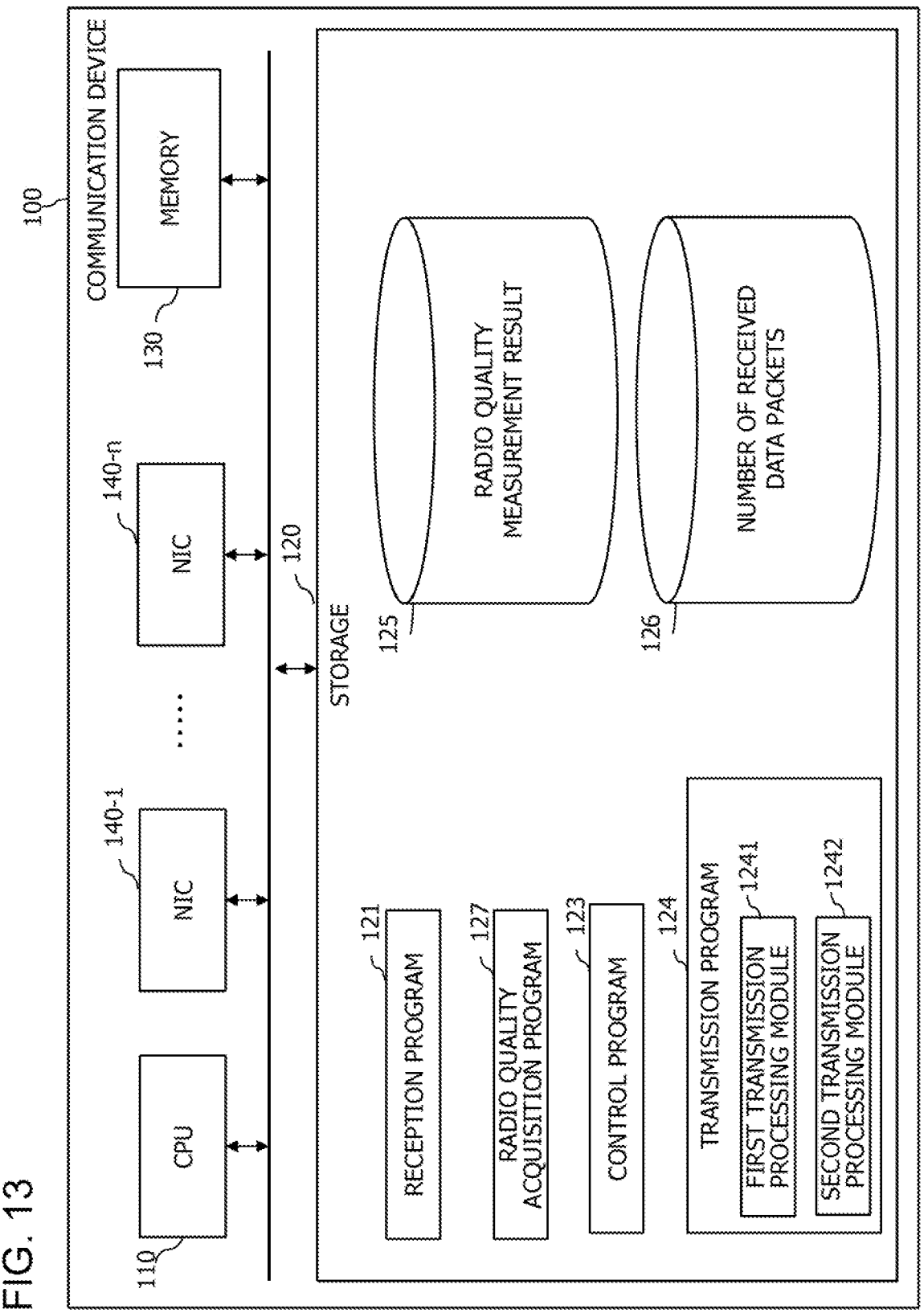
FIG. 13 is a figure depicting an example configuration of the communication device.

FIG. 13 is a figure depicting an example configuration of the communication device 100. The communication device 100 stores a radio quality acquisition program 127 in the storage 120.

By executing the radio quality acquisition program 127, the CPU 110 constructs a radio quality acquirer in order to execute radio quality acquisition processing. The radio quality acquisition processing is processing for acquiring the radio quality by issuing a request to the other communication device or the relay device to transmit the radio quality and receiving a response to the request.

Radio Quality Acquisition Processing

Figure 14:
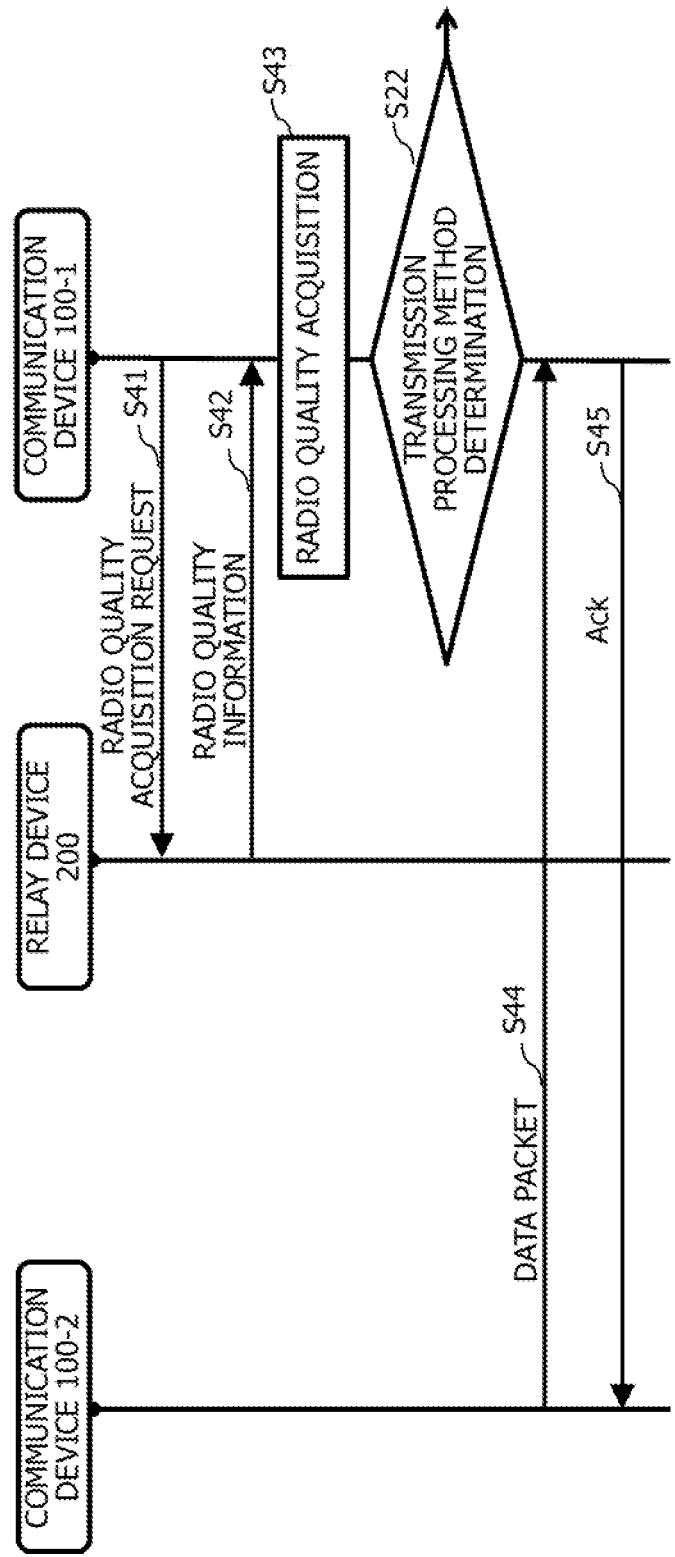
FIG. 14 is a figure depicting an example of a sequence for acquiring the radio quality from the relay device.

FIG. 14 is a figure depicting an example of a sequence for acquiring the radio quality from the relay device. The relay device 200 is connected wirelessly to the communication device 100-1 in order to allocate communication resources to the communication device 100-1. The relay device 200 also relays packets that are exchanged between the communication devices 100-1, 2. The relay device is an eNodeB in LTE, for example. When the device that allocates the communication resources differs from the device that implements data communication, the sequence illustrated in FIG. 14 is employed.

The communication device 100-1 transmits a radio quality acquisition request to the relay device 200 (S41). The radio quality acquisition request is a message asking the relay device 200 to transmit information relating to the radio quality. The communication device 100-1 transmits the radio quality acquisition request periodically, for example.

Upon reception of the radio quality acquisition request (S41), the relay device 200 transmits radio quality information to the communication device 100-1 (S42). The radio quality information is a message including information relating to the radio quality. The relay device 200 may transmit information relating to the radio quality that is stored internally therein, or may measure the radio quality upon reception of the radio quality acquisition request and transmit the measurement result.

Upon reception of the radio quality information (S42), the communication device 100-1 acquires the information relating to the radio quality, included in the radio quality information (S43). The communication device 100-1 determines from the acquired information relating to the radio quality whether or not the radio quality is favorable, and determines which of the first transmission processing and the second transmission processing to execute (S22). Thereafter, data packets are received (S44) and ACKs are transmitted (S45) by executing the first or second transmission processing in accordance with the determination.

Figure 15:
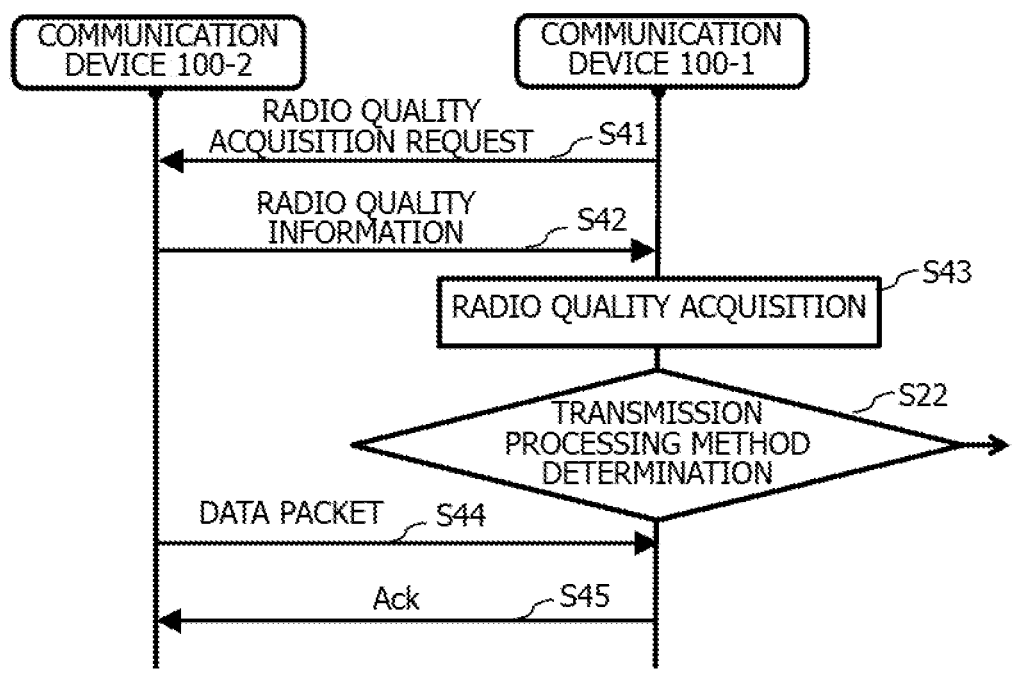
FIG. 15 is a figure depicting an example of a sequence for acquiring the radio quality from the communication device.

FIG. 15 is a figure depicting an example of a sequence for acquiring the radio quality from the communication device. The communication device 100-2 is connected wirelessly to the communication device 100-1 in order to allocate communication resources to the communication device 100-1. The communication device 100-2 also exchanges packets with the communication device 100-1. The communication device 100-2 is an eNodeB in LTE, for example. When the device that allocates the communication resources is identical to the device that implements communication, the sequence illustrated in FIG. 15 is employed.

In the fourth embodiment, the communication device that transmits ACKs acquires the radio quality from the other communication device or the relay device rather than measuring the radio quality. Hence, a radio quality measured when the other communication device or the relay device allocates radio resources to the communication device can be appropriated, for example, thereby eliminating the need to measure the radio quality anew. When the radio quality is measured, a processing load on the communication device increases and a wait time occurs while the measurement is completed, and as a result, the throughput may decrease. According to the third embodiment, therefore, the number of times the radio quality is measured in the communication system can be reduced, and as a result, a reduction in throughput due to measurement of the radio quality can be prevented.

Fifth Embodiment

Next, a fifth embodiment will be described.

In the fifth embodiment, when special reception confirmation processing is executed, the communication device sets a bearer that is different to that of another TCP session independently in a TCP session to which an ACK to be transmitted belongs. The special reception confirmation processing will be described below. Further, the bearer is a transmission path for transmitting a data packet, for example.

Bearers in LTE

Figure 16:
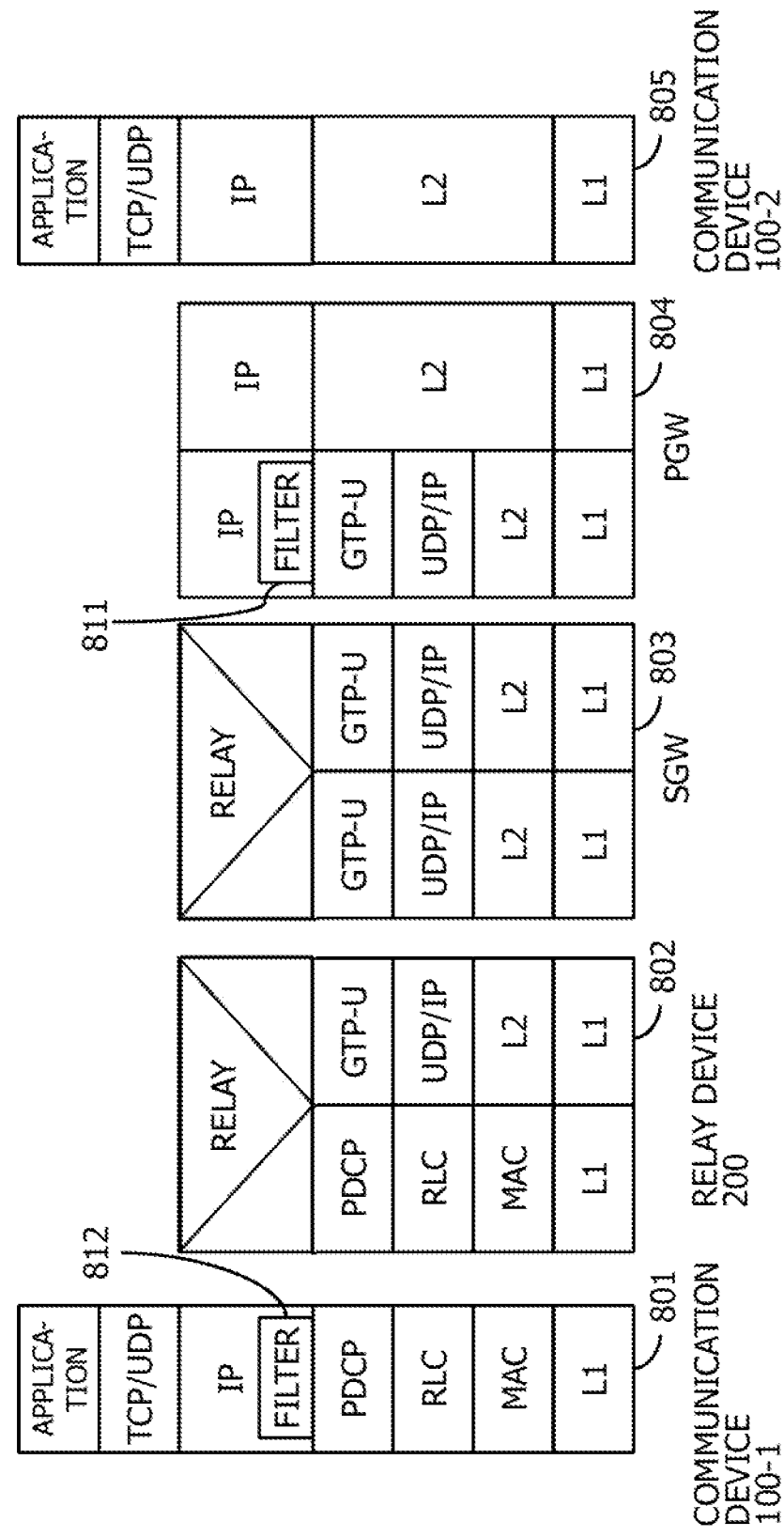
FIG. 16 is a figure depicting an example of a protocol stack in a communication system.

FIG. 16 is a figure depicting an example of a protocol stack in a communication system. The communication system 10 is an LTE communication system, for example, and the relay device 200 is an eNB, i.e. an LTE base station device.

A protocol stack 800 illustrated in FIG. 16, for example, can be applied to the communication system 10. The protocol stack 800 is an LTE-A protocol stack as defined by the 3GPP. Layer groups 801 to 805 are groups respectively indicating processing executed by the communication device 100-1, the relay device 200, an SGW (Serving Gateway) not depicted in the figure, a PGW (Packet data network Gateway) not depicted in the figure, and the communication device 100-2.

In the communication system 10, each device transmits packets using an IP protocol (referred to hereafter as an IP flow). In the communication system 10, IP flow filtering is implemented so that each IP flow is handled in accordance with a QoS (Quality of Service) class. For example, with respect to a downlink on which the communication device 100-1 receives IP flows, the PGW executes packet filtering on the IP flows so as to classify each IP flow into an EPS (Evolved Packet System) bearer. An EPS bearer is an IP flow in an Evolved Packet System.

With respect to an uplink on which the communication device 100-1 transmits IP flows, the PGW notifies the communication device 100-1 of a packet filtering rule. The communication device 100-1 then executes packet filtering on the IP flows on the basis of the filtering rule received from the PGW so as to classify each IP flow into an EPS bearer.

For example, on the uplink, the PGW executes IP flow filtering using a filter layer 811 (Filter) included in an IP layer (IP) within the layer group 804 of the PGW. Further, on the downlink, the communication device 100-1 executes IP flow filtering using a filter layer 812 (Filter) included in an IP layer (IP) within the layer group 801 of the communication device 100-1.

Furthermore, to allow a router (not depicted) provided in the communication system 10 to execute QoS control (or QoS management), the PGW (in the case of a downlink) or the communication device 100-1 (in the case of an uplink) sets a QoS value in a ToS (Type of Service) field of the header of an IP packet.

The packet filtering executed by the PGW or the communication device 100-1 is performed using, for example, a 5-tuple (transmission/reception source IP addresses, transmission/reception source port numbers, and the protocol type). The filtering rule of the packet filtering is known as a TFT (Traffic Flow Template), for example. Note that the EPS bearers may include EPS bearers not having a set TFT.

When IP flow filtering is implemented using a TFT, the IP flows can be classified into a maximum of 11 types of EPS bearers. One of the EPS bearers is referred to as a default bearer. The default bearer is generated when the PGW allocates an IP address to the communication device 100-1, and exists at all times until the IP address allocated to the communication device 100-1 is released. The EPS bearers other than the default bearer are referred to as dedicated bearers. The dedicated bearers can be generated and released as appropriate in accordance with the conditions of user data to be transmitted.

Bearer Setting Processing

Figure 17:
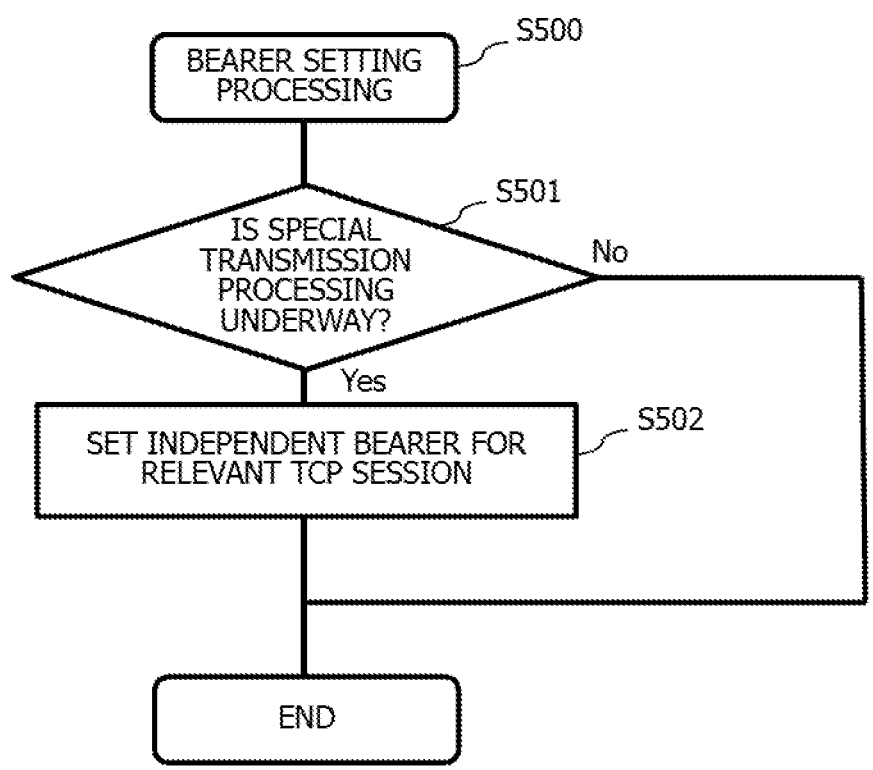
FIG. 17 is a figure depicting an example of a processing flowchart of bearer setting processing.

FIG. 17 is a figure depicting an example of a processing flowchart of bearer setting processing (S500). Note that bearer setting may be executed by any of the communication devices 100-1, 2, the relay device 200, the SGW, the PGW, and so on, for example. Further, a set bearer may be reset as appropriate. A case in which the communication device 100-1 executes bearer setting (or resetting) will be described below. The bearers set in the bearer setting processing are EPS bearers, for example.

The communication device 100-1 executes the bearer setting processing (S500) when an ACK is to be transmitted. Note that the bearer setting processing (S500) may also be executed when a data packet is received. Further, the bearer setting processing may be executed when the communication device 100-1 switches between the first and second transmission processing.

The communication device 100-1 checks whether or not special transmission processing is underway (S501). In a case where the first number is 2 and the second number is 1, the special processing is the first transmission processing. In the second transmission processing, an ACK is transmitted every time a data packet is received, whereas in the first transmission processing, special processing is executed such that an ACK is not transmitted until two data packets have been received. The special processing may also be processing in which ACKs are stored until an ACK transmission opportunity arises, and when an ACK transmission opportunity arises, only the ACK relating to the most recently received packet is transmitted, for example. The special processing may also be processing in which ACKs are stored until an ACK transmission opportunity arises, and when an ACK transmission opportunity arises, ACKs are transmitted in a number corresponding to radio resources allocated by a base station device or the like, for example.

When special transmission processing is underway (Yes in S500), the communication device 100-1 sets an independent bearer as a TCP session (referred to hereafter as the relevant TCP session) corresponding to the relevant ACK (S501). The set independent bearer may be a dedicated bearer or the default bearer. Further, the set independent bearer may be constituted by respectively different uplink and downlink bearers. Furthermore, as regards as the set independent bearer, on the downlink, a bearer may be set in a condition where a TCP session other than the relevant TCP session coexists therewith, while on the uplink only, a bearer may be set independently in order to transmit ACKs during the relevant TCP session. It is sufficient to set the independent bearer at least so that on the uplink, ACK transmission during the relevant TCP session does not coexist with another TCP session.

In the fifth embodiment, an independent bearer is set for ACK transmission. In so doing, the packets received by the communication device on the independent bearer are all relevant ACKs. Hence, header analysis can be omitted, and as a result, the processing load of the communication device can be lightened, enabling a reduction in power consumption.

Radio Bearer Setting Processing

Figure 18:
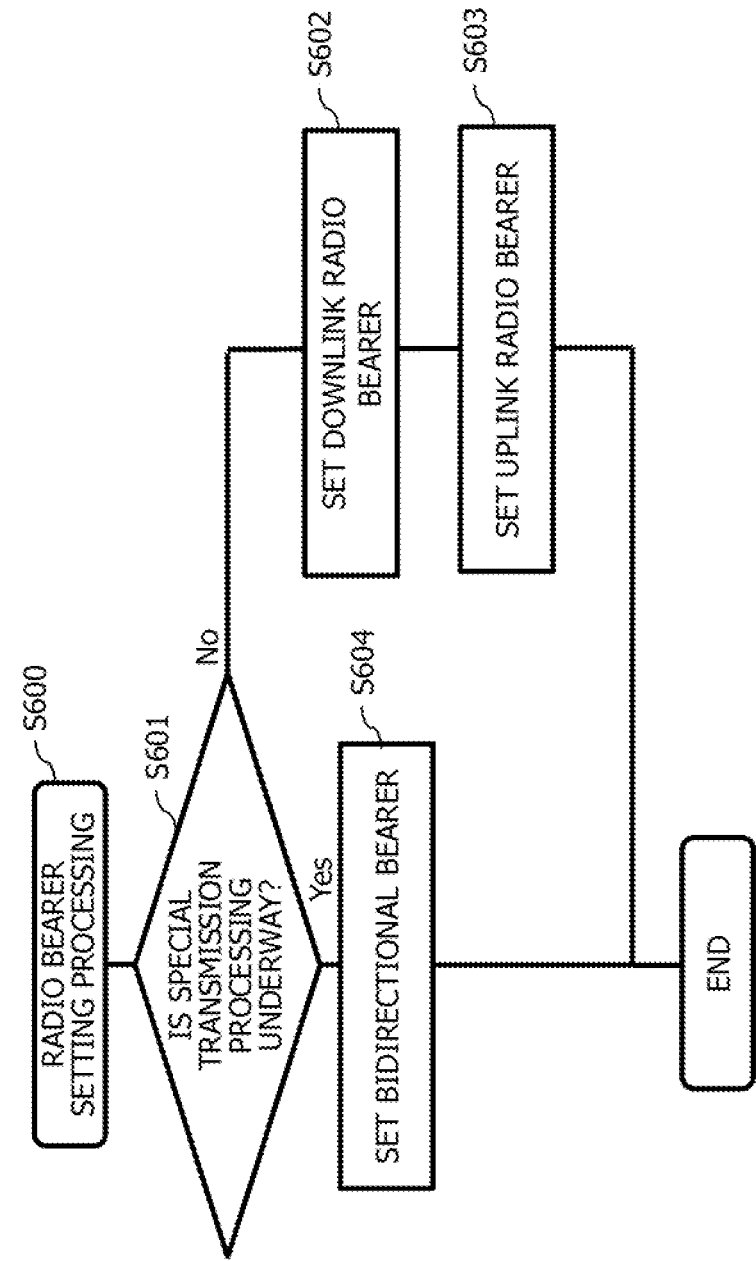
FIG. 18 is a figure depicting an example of a processing flowchart of radio bearer setting processing.

FIG. 18 is a figure depicting an example of a processing flowchart of radio bearer setting processing (S600). Note that a radio bearer is a communication path used for wireless communication between the relay device 200 and the communication device 100, for example, and is set wirelessly every time a series of data is transmitted and received. Radio bearer setting may be executed by any of the communication devices 100-1, 2, the relay device 200, and so on, for example. Further, a set radio bearer may be reset as appropriate. A case in which the communication device 100-1 executes bearer setting (or resetting) will be described below.

The communication device 100-1 executes the radio bearer setting processing (S600) when an ACK is to be transmitted. Note that the radio bearer setting processing (S600) may also be executed when a data packet is received. Further, the bearer setting processing may be executed when the communication device 100-1 switches between the first and second transmission processing.

The communication device 100-1 checks whether or not the special transmission processing is underway (S601). When the special transmission processing is not underway (No in S601), the communication device 100-1 sets a downlink radio bearer as a communication path on which to receive downlink data (S602). Note that when a downlink radio bearer has been set by the relay device 200, the communication device 100-1 uses the set downlink radio bearer rather than setting a new downlink radio bearer. The communication device 100-1 then sets an uplink radio bearer as a communication path on which to transmit ACKs (S603). The uplink radio bearer is set in a communication mode in which either no or few ACKs are retransmitted. In the LTE protocol, for example, the set communication mode is an RLC (Radio Link Control) UM mode (Unacknowledged mode) in which even ACKs that do not arrive are not retransmitted, or an RLC TM mode (Transparent mode) in which the RLC itself is transparent.

When special transmission processing is underway (Yes in S601), the communication device 100-1 sets a bidirectional bearer as a communication path on which to receive uplink and downlink data (S604). A bidirectional bearer is a radio bearer serving as both uplink and downlink communication paths.

In the radio bearer setting processing, when the special transmission processing is not underway, or in other words when the second transmission processing has been selected, separate radio bearers are set for the uplink and the downlink. In this case, the communication device sets a mode in which few ACKs are transmitted as the downlink radio bearer. In the second transmission processing, the number of transmitted ACKs is larger than in the first transmission processing, and therefore, by setting a mode in which few ACKs are transmitted, as described above, the number of transmitted ACKs can be reduced while securing a communication path for downlink data. As a result, a reduction in throughput due to ACK transmission can be prevented.

Note that in the radio bearer setting processing, when the special transmission processing is underway, or in other words when the first transmission processing is executed, the number of transmitted ACKs can be reduced by the transmission processing itself, and therefore separate radio bearers are not set for the uplink and the downlink. However, to further reduce the number of transmitted ACKs when the first transmission processing is executed, separate radio bearers may be set for the uplink and the downlink in a similar manner to a case in which the special transmission processing is not underway.

Other Embodiments

The processing executed in the respective embodiments may be combined.

For example, the radio quality acquisition processing according to the fourth embodiment may be implemented in the first or second embodiment. Further, the communication device 100 may include both the radio quality acquisition processing according to the fourth embodiment and the radio quality measurement processing according to the second embodiment. When both types of processing are included, the communication device may switch between the radio quality acquisition processing and the radio quality measurement processing in accordance with the processing load thereof and radio quality measurement conditions in the other communication device or the relay device, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: Communication system
100: Communication device
101: Receiver
102: Controller
103: Transmitter
110: CPU
120: Storage
121: Reception program
122: Radio quality measurement program
123: Control program
124: Transmission program
125: Radio quality measurement result
126: Number of received data packets
127: Radio quality acquisition program
130: Memory
200: Relay device
300: Network
800: Protocol stack
801-805: Layer group
811, 812: Filter layer
1241: First transmission processing module
1242: Second transmission processing module

What is claimed is:

1. A communication device comprising:
a receiver configured to receive a packet from another communication device;
a transmitter configured to execute:
first transmission processing, in which an ACK (acknowledgement) indicating reception of a first number of packets is transmitted to the other communication device every time the first number of packets are received from the other communication device; and
second transmission processing, in which an ACK indicating reception of a second number of packet/packets, the second number being smaller than the first number, is transmitted to the other communication device every time the second number of packet/packets is/are received from the other communication device; and
a controller configured to control the transmitter to execute the first transmission processing when a radio quality of wireless communication with the other communication device is unfavorable,
wherein the controller is further configured to control the transmitter to execute the second transmission processing when the radio quality of the wireless communication with the other communication device is favorable.

2. The communication device according to claim 1, wherein
the radio quality is a degree of interference generated at a frequency of radio waves used for the wireless communication, and
the controller is further configured to:
control the transmitter to execute the second transmission processing when the degree of interference is lower than a reference value; and
control the transmitter to execute the first transmission processing when the degree of interference equals or exceeds the reference value.

3. The communication device according to claim 1, further comprising a measurer configured to measure the radio quality.

4. The communication device according to claim 3, wherein
the measurer is configured to measure the radio quality periodically, and
the controller is configured to control the transmitter when the radio quality is measured.

5. The communication device according to claim 1, further comprising a radio quality acquirer configured to acquire information relating to the radio quality from a relay device that is configured to relay packets that are exchanged with the other communication device and that is configured to allocate radio waves used for the wireless communication.

6. The communication device according to claim 1, further comprising a radio quality acquirer configured to acquire information relating to the radio quality from the other communication device, which is configured to allocate radio waves used for the wireless communication.

7. A communication method comprising:
receiving a packet from another communication device; and
executing:
first transmission processing, in which an ACK (acknowledgement) indicating reception of a first number of packets is transmitted to the other communication device every time the first number of packets are received from the other communication device; and
second transmission processing, in which an ACK indicating reception of a second number of packet/packets, the second number being smaller than the first number, is transmitted to the other communication device every time the second number of packet/packets is/are received from the other communication device,
wherein the other communication device is configured to execute the first transmission processing when wireless quality of wireless communication with the other communication device is unfavorable, and
wherein the other communication device is further configured to execute the second transmission processing when the radio quality of the wireless communication with the other communication device is favorable.

8. A communication system comprising:
a first communication device configured to transmit a packet to a second communication device; and
the second communication device, which is configured to receive the packet from the first communication device and, is configured to execute:
first transmission processing, in which an ACK (acknowledgement) indicating reception of a first number of packets is transmitted to the first communication device every time the first number of packets are received from the first communication device; and
second transmission processing, in which an ACK indicating reception of a second number of packet/packets, the second number being smaller than the first number, is transmitted to the first communication device every time the second number of packet/packets is/are received from the first communication device,
wherein the second communication device is configured to execute the first transmission processing when wireless quality of wireless communication with the first communication device is unfavorable, and
wherein the second communication device is further configured to execute the second transmission processing when the wireless quality of the wireless communication with the first communication device is favorable.

* * * * *